(12) United States Patent
Schroder et al.

(10) Patent No.: US 12,211,079 B1
(45) Date of Patent: Jan. 28, 2025

(54) RECYCLED AUTO PART REAL TIME AVAILABILITY VERIFICATION

(71) Applicant: Used-Car-Parts.com, Inc., Fort Wright, KY (US)

(72) Inventors: Jeffrey L. Schroder, Fort Mitchell, KY (US); Jeffrey Joseph Schroder, Cincinnati, OH (US); Jeffrey W. Mueller, Taylor Mill, KY (US); Jeffrey Dalton Chastain, Fort Wright, KY (US); Luis Daniel Canisalez, Fort Wright, KY (US); Jeremy M. Mount, Fort Wright, KY (US); Aaron Edward Daniel, Fort Wright, KY (US); Robert S. Cohen, Brooklyn Park, MN (US); Laura Beth Donica, Fort Wright, KY (US)

(73) Assignee: Used-Car-Parts.com, Inc., Fort Wright, KY (US)

( * ) Notice: Subject to any disclaimer, the term of this patent is extended or adjusted under 35 U.S.C. 154(b) by 0 days.

(21) Appl. No.: 18/507,067

(22) Filed: Nov. 12, 2023

Related U.S. Application Data

(60) Continuation of application No. 16/137,798, filed on Sep. 21, 2018, now abandoned, which is a division of
(Continued)

(51) Int. Cl.
  *G06Q 30/00* (2023.01)
  *G06Q 10/087* (2023.01)
  *G06Q 30/0601* (2023.01)

(52) U.S. Cl.
  CPC ....... *G06Q 30/0623* (2013.01); *G06Q 10/087* (2013.01)

(58) Field of Classification Search
  None
  See application file for complete search history.

(56) References Cited

U.S. PATENT DOCUMENTS

| 5,839,112 | A | 11/1998 | Schreitmueller et al. |
| 8,458,056 | B1 | 6/2013 | Prather et al. |

(Continued)

OTHER PUBLICATIONS

Mitchell Repair Center article, dated Sep. 14, 2012, available at http://products.car-part.com/press/MitchellRepairCenter_CarPartPro_PressRelease.pdf (Year: 2012).

(Continued)

*Primary Examiner* — Mila Airapetian
(74) *Attorney, Agent, or Firm* — Wood Herron & Evans LLP

(57) ABSTRACT

Availability of recycled auto parts listed in a centralized inventory system is verified by a query to the inventory system carrying the part. The query identifies the part and data about the part of relevance to a potential buyer (such as price, condition, location) to be verified. Verifications can be performed upon explicit user request, or upon actions implicitly requiring verification, such as adding a part to an estimate or shopping cart, ordering a part, or requesting the part seller to hold the part for future purchase, or the like; verification may also be automatically performed for some or all search results. Results of a verification may also be broadcast to the potential buyer and to the part seller (broker and/or part supplier) to enable audit and follow-up on the verification request.

8 Claims, 36 Drawing Sheets

Related U.S. Application Data application No. 14/187,203, filed on Feb. 21, 2014, now Pat. No. 10,083,472, which is a continuation-in-part of application No. 13/937,261, filed on Jul. 9, 2013, now abandoned.

(60) Provisional application No. 61/794,152, filed on Mar. 15, 2013, provisional application No. 61/669,320, filed on Jul. 9, 2012.

(56) References Cited

U.S. PATENT DOCUMENTS

| | | | |
|---|---|---|---|
| 8,527,373 | B1 | 9/2013 | Ricci et al. |
| 10,083,472 | B1 | 9/2018 | Schroder et al. |
| 2002/0148090 | A1 | 10/2002 | Kaburagi et al. |
| 2002/0184135 | A1 | 12/2002 | Zakaria |
| 2003/0004761 | A1 | 1/2003 | Lampe et al. |
| 2003/0163737 | A1 | 8/2003 | Roskind |
| 2004/0034566 | A1* | 2/2004 | Nagata .............. G06Q 20/203 705/22 |
| 2005/0125261 | A1* | 6/2005 | Adegan .............. G06Q 40/08 705/4 |
| 2005/0144095 | A1 | 6/2005 | Scruton et al. |
| 2005/0187834 | A1 | 8/2005 | Painter et al. |
| 2006/0167717 | A1 | 7/2006 | Desenberg |
| 2007/0156675 | A1 | 7/2007 | Dalton et al. |
| 2007/0175992 | A1 | 8/2007 | Brown |
| 2008/0275796 | A1 | 11/2008 | Katircioglu |
| 2011/0010276 | A1* | 1/2011 | Bowser ............. G06Q 10/0875 705/29 |
| 2011/0161182 | A1 | 6/2011 | Racco |
| 2011/0184927 | A1* | 7/2011 | Dalton ................ G06Q 10/087 707/706 |
| 2011/0313888 | A1 | 12/2011 | Rice |
| 2014/0122130 | A1* | 5/2014 | Kelly .................. G06Q 40/08 705/305 |
| 2014/0278572 | A1* | 9/2014 | Mullen ............... G07C 5/008 705/4 |

OTHER PUBLICATIONS http://web.archive.org/web/20050205001945/www.a-r-a.org/standards/index.htm17/1/2009 (Feb. 2005).

ITS, Inc., M&M Auto Parts, "The Reliable Recycler", Website page printout ID=230809459, Copyright 2005, printed Dec. 12, 2005.

ITS, Inc., M&M Auto Parts, "The Reliable Recycler", Website page printout ID=230809460, Copyright 2005, printed Dec. 12, 2005.

ITS, Inc., M&M Auto Parts, "The Reliable Recycler", Website page printout ID=230785907, Copyright 2005, printed Dec. 12, 2005.

ITS, Inc., M&M Auto Parts, "The Reliable Recycler", Website page printout ID=230822168, Copyright 2005, printed Dec. 12, 2005.

ITS, Inc., M&M Auto Parts, "The Reliable Recycler", Website page printout ID=230785748, Copyright 2005, printed Dec. 12, 2005.

ITS, Inc., M&M Auto Parts, "The Reliable Recycler", Website page printout ID=230785747, Copyright 2005, printed Dec. 12, 2005.

ITS, Inc., M&M Auto Parts, "The Reliable Recyder", Website page printout ID=230785745, Copyright 2005, printed Dec. 12, 2005.

ITS, Inc., M&M Auto Parts, "The Reliable Recyder", Website page printout ID=230811794, Copyright 2005, printed Dec. 12, 2005.

ITS, Inc., M&M Auto Parts, "The Reliable Recycler", Website page printout ID=230821967, Copyright 2005, printed Dec. 12, 2005.

* cited by examiner

FIG. 6

| Year Part Model | Description |
|---|---|
| 2000 Fender Toyota Camry | -RH GRAY FTW<br>* Seller only delivers to part of this ZIP code. |

FIG. 16

| | |
|---|---|
| 1998 Fender Toyota Camry | -RH BLUE FTWDIS 000<br>* Certain restrictions or conditions apply to this delivery. Please click Live Service to contact seller for details. |

FIG. 17

| | |
|---|---|
| 2000 Fender Toyota Camry | NEW AFTERMARKET<br>* Your part does not meet the $150 minimum order requirement for free delivery. |

1. Time to Loading Dock (dismantler, lead, & pull): [?]
   [Y] parts are pulled: M:☑ T:☑ W:☑ R:☑ F:☑ S:☐ U:☐
   [U] parts are pulled: M:☑ T:☑ W:☑ R:☑ F:☑ S:☐ U:☐
   [W] parts are pulled: M:☑ T:☑ W:☑ R:☑ F:☑ S:☐ U:☐
   [dis] parts are pulled: M:☑ T:☑ W:☑ R:☑ F:☑ S:☐ U:☐

FIG. 24

Inventory uploaded without these category values will utilize the [Y] / [dismantler] times.

Dismantler checkbox indicates that a [Y] part requires vehicle dismantling, for which [dismantler] time will be used.

| 0 | 0 | 0 | Lead Time |
| Y | U | W | dismantler | Part Pull Time [Restore] [Clear] |

FIG. 25

| Y | U | W | dismantler | Part Pull Time [Restore] [Clear] |
|---|---|---|---|---|
| Y | U | W | dis | All Parts: (apply to all parts) |
| Y | U | W | dis | ☐ A Pillar |
| Y | U | W | dis | ☐ A/C Compressor |
| Y | U | W | dis | ☐ A/C Compressor Clutch Only |
| Y | U | W | dis | ☐ A/C Condenser |
| Y | U | W | dis | ☐ A/C Evaporator |
| Y | U | W | dis | ☐ A/C Evaporator Housing only |

[Save]

FIG. 26

4. Warranty Information:
Enter or modify your warranties with the Warranty Tool.

FIG. 31

5. Return Policies: ?
Return policies can be:
Cash, Store credit, eXchange, No return

| policy | days | fee | $or% | Type |
|---|---|---|---|---|
| | | | | All Parts: (apply to all parts) |
| | | | | A Pillar |
| | | | | A/C Compressor |
| | | | | A/C Compressor Clutch Only |
| | | | | A/C Condenser |
| | | | | A/C Evaporator |
| | | | | A/C Evaporator Housing only |

Set Policy For: Drivetrain  Non-Drivetrain (mech)
Exterior Cutoff  Exterior Non-Cutoff  Glass
Interior  Electrical Save

FIG. 32

Set the values for this part group
Drivetrain
policy    days    fee    $or%

Apply              Cancel

FIG. 33

FIG. 37
FIG. 38
FIG. 39

| | Use Map Tool: | Same Settings As: | No Delivery: |
|---|---|---|---|
| Shop: | ◉ Edit | ○ | ○ |
| Insurance: | ◉ Edit | ○ | ○ |
| Recycler: | ◉ Edit | ○ | ○ |
| Broker: | ○ Edit | ○ | ◉ |
| Consumer: | ◉ Edit | ○ | ○ |

2. Delivery Zone Mapping & Eligibility:

Save

RECYCLED AUTO PART REAL TIME AVAILABILITY VERIFICATION

CROSS REFERENCE TO RELATED APPLICATIONS

This application is a continuation of U.S. patent application Ser. No. 16/137,798 filed Sep. 21, 2018, now allowed, which is a divisional of U.S. patent application Ser. No. 14/187,203 filed Feb. 21, 2014, which issued as U.S. Pat. No. 10,083,472 on Sep. 25, 2018, and claims benefit of U.S. patent application Ser. No. 13/937,261 filed Jul. 9, 2013, U.S. Provisional Patent Application Ser. No. 61/794,152 filed Mar. 15, 2013, and U.S. Provisional Patent Application Ser. No. 61/669,320 filed Jul. 9, 2012, all of which previously filed applications are hereby incorporated by reference herein in their entirety.

TECHNICAL FIELD

This invention relates to computerized systems for the location and sale of vehicle parts.

BACKGROUND OF THE INVENTION

Commerce in vehicle parts faces some unique challenges not applicable to other forms of merchandise and products.

Vehicle parts fall generally into three categories: original equipment parts, aftermarket parts, and recycled parts. Original equipment parts and aftermarket parts are often supplied in much the same manner as other items: they are kept in warehouses and shipped when needed. Used, remanufactured, reconditioned, OE surplus, blemished OE, and OE discount parts (hereafter referenced collectively as "recycled parts"), however, have significant differences from other items. In many ways, each recycled part is unique in its character and circumstances. As discussed in earlier patent filings of the assignee, recycled parts can be difficult to properly match to other interchangeable parts in target vehicles, and further, recycled parts can have unique damage which must be repaired and can have attributes such as original paint or options which render interchangeable parts unlike each other. These two issues have been specifically addressed by inventions of the assignee which are implemented on the assignee's web site car-part.com.

The fact that each part is unique and may have different conditions, colors, and at times accessories on an assembly, means that a given recycled part's usefulness to a buyer is different than a similar part that technically interchanges with the damaged part on a vehicle. Thus, while a site like car-part.com may have 150 million parts, that inventory is unlike the inventory of a seller of a conventional type of product, such as a new or aftermarket auto part seller. Specifically, an inventory of 150 million parts is best viewed as an inventory of 150 million different specific items, each available in a quantity of one. These individualities mean that recycled parts must be tracked individually at each step in the process, so the buyer can understand the additional products and services (e.g., damage repair, painting, rework) associated with each part, furthermore, the availability of a specific individual part, rather than another interchangeable part, is relevant to buyers in a way that is simply not the case with new parts. Indeed, in many cases required parts for a repair are not cataloged into a part interchange system —for example, trim parts and the like. These parts have even greater individuality than those which are catalogued by an interchange system.

A third way in which recycled vehicle parts are individual and unique is that they are not commonly inventoried. There is no central, synchronized ordering system or a central inventory management system spanning the universe of auto recyclers. Unlike, for example, airline tickets, inventory systems at major retailers, and the like, which operate out of a common database, the thousands of auto part recyclers across the country operate and sell parts out of their own respective systems throughout the day, which are not synchronized to a common database (such as car-part.com) until, for example, a nightly upload. Consequently, every recycler inventory system has its own inventory records which may mismatch with the inventory that is presented at derivative databases such as that collected and presented by car-part.com. This differs greatly from original equipment parts or aftermarket parts which are typically available in large quantities at a centralized warehouse and are ready to be shipped from the centralized warehouse as orders are received, thereby resulting in a relatively consistent handling and delivery process when original equipment or aftermarket parts are ordered.

Moreover, the inventory presented at a site like car-part.com is derived from a large number of inventory databases at individual recycler inventory management systems. Every one of these management systems is different, using different inventory coding and methods, requiring substantially different software to acquire and process each recycler's inventory for inclusion in a common database. Additionally, the fields available in each inventory management system differ substantially, and the availability of parts may also vary greatly. As one example, parts listed in a given recycler's inventory may be in one of several stages in the auto recycler's dismantling process. Some parts are inventoried while the vehicle is still at the salvage auction, others are inventoried in a holding pen at the recycling facility, and may be kept on a vehicle until needed, others are dismantled from the vehicle and placed in racks for storage until needed, and still others are dismantled from the vehicle but left in the vehicle in a storage yard. Some parts can be taken off the vehicle without dismantling the vehicle while other parts are more practical to take off when the entire vehicle is being dismantled.

Inventory management systems generally attach codes to inventory records of parts to identify their status in this process; although there is a convention for these codes, because different recycling facilities have a different physical layout and work practices, the detailed significance of these codes can be different. For example, a code of W may mean that the part is in a local warehouse at one recycler but may mean the part is in a remote warehouse or even in a readily accessible dismantling area at another recycler. Although the codes are standard, only the individual recycler is familiar with how parts are coded. There are other variations used in the industry; in some cases, inventory is tagged with category codes at the vehicle level, which may override to location codes to identify where a part is in the dismantling process.

The process in which a single part is sold can thus be unusually complex. When a customer orders the part through a central database, the part may no longer be in inventory at the recycler, or the part may be in a condition which renders it not immediately available. As an example of the latter condition, the dismantling of an entire vehicle may be required to obtain the part. Some recyclers may refuse to undertake such a step for the sake of the sale of a single part, or there may be an inherent delay before a recycler is able to perform the required dismantling due to limited resources or queues at the recycler. For example, dismantling may only be done on Monday and Wednesday. Parts may be pulled from cars in the yard only on certain days or at certain times. As a result of these inventory handling practices which are largely unique to recycled parts, the amount of time that it takes to complete the dismantling and/or handling workflow for any given recycled part is likely to vary greatly on a part-to-part basis. This means that even for parts which are available from a recycler, an order for the part may have a complex outcome (something other than a completed sale as originally intended).

Another complicating factor is that auto recyclers typically supplement their own physical inventories by establishing brokering relationships with other parts suppliers (which may be other auto recyclers, aftermarket part suppliers, and/or original equipment part providers). While this practice increases the selling opportunities for part suppliers which participate in such brokering relationships and increases the effective inventory of a brokering yard to include the parts they broker, it further complicates the logistics of acquiring a given part and results in another layer of inventory uncertainty, as brokered parts presented in an inventory system represent available parts at a time in the past when the brokering database was last updated. Furthermore, brokering may occur in multiple levels; a broker may offer parts that are available through another broker that in turn sources those parts from the ultimate part supplier.

Another characteristic that makes recycled parts unique, is the need for special delivery. Typically, people who sell a product are not in the business of delivering those parts-instead, they rely on major logistics companies who provide common carrier shipping and/or freight services. Because these are commodity services, there is a great deal of uniformity surrounding the level of service with respect to shipping and handling, and customers can easily ascertain the associated cost and time. In contrast, many recycled parts are fragile. The vast majority of common carriers have no effective way to deliver fragile parts like windshield glass, or sheet metal parts like a fender, or a door. Major logistics companies do not provide the services needed to effectively move these parts, so recyclers typically offer delivery services themselves, at least for professionals (i.e. to shops as well as recyclers with whom they maintain a brokering relationship, as opposed to individuals). As a result, instead of a few major companies providing very similar logistic services, the vehicle recycling industry has thousands of auto recyclers who provide their own delivery services, and therefore the degree of certainty and uniformity surrounding the shipping and handling services for the parts auto recyclers provide, is much lower than the degree of certainty and uniformity across product providers in other industries. Some recyclers may only deliver within 25 miles, some may deliver to a big city 75 miles north on Tuesday and Thursday, while they send the same truck to the major city 50 miles south on Monday, Wednesday, and Friday. Some recyclers run multiple trucks to make sure they can deliver everywhere, every day, while others only run 1 truck, and delivery may take up to 3 days. A recycler might deliver engines the same day they become available (following the dismantling process), while they may deliver an alternator only if they already have more substantial deliveries in the area. Because each recycler offers unique delivery services, and may offer different levels of service based on part type, price, and buyer type, the result is that each part is also unique in terms of the associated delivery service. Parts brokering further complicates the situation, as the unique delivery service of multiple parties must be understood to effectively gauge the ultimate delivery time of the part at the buyer's location.

While vehicle parts have always been in demand, recycled vehicle parts are increasingly popular with body shops and repair facilities because of their lower cost and like quality to original vehicle parts. The repair shop and auto salvage yard are integral parts of the insurance industry claims department supply chain that processes claims for customers involved in vehicle accidents; that supply chain includes shops that repair the vehicles (using, where possible, recycled parts from other vehicles) and finalize the claim from the accident, as well as recyclers that provide parts to shops and provide part inventory information to insurance estimators that make the determination of the optimal part for the repair facility to use in each repair.

Cycle time or repair time at the shop is very important to efficient handling of an insurance claim, for several reasons. First, the insurance consumer temporarily loses access to the car while it is being repaired and is generally intolerant of a long delay while a vehicle is being repaired. Moreover, the insurance claim often includes coverage for a rental vehicle, which must be reimbursed by the insurer. Additionally, because of the pressures of insurance cost management and consumer demands, body shops have adopted lean manufacturing or "just in time" techniques. Shops often use workflow management systems to schedule production. For example, to reduce cost and improve efficiency, repair/body shops often repair vehicles in a production line type environment, which reduces costs but has the side effect that part unavailability for one vehicle can prevent processing of more than just that one vehicle. Furthermore, body shops do not typically inventory parts, and maintain a minimal layout for storing and maneuvering cars while under repair.

Thus, insurance companies, body shops and repair facilities are generating ever increasing demand for recycled parts while at the same time, these purchasers are demanding greater certainty in the availability of requested parts to enable a 'just-in-time' repair supply chain. The auto recycler has thus become a part supplier to a repair shop assembly line where the margins for error are very low and each part in the supply chain is unique. In this environment, the auto recycler has unique challenges. Because each part is unique and coming from a limited supply of salvage vehicles, if the recycler is unable to supply the part the buyer chose, the recycler may not be able to supply an alternatively acceptable part to the buyer, even though there may be interchangeable parts, due to different colors, damage levels, accessories, delivery times, and the like. This then creates a disincentive to use a central database to locate recycled parts, unless and until a means exists for confirming the availability of parts located through the central database.

Given the size of the distributed system, with over 4,400 recycler systems, it is simply not realistic or feasible, with current hardware constraints, to maintain real time synchronization of part availability information across all applicable systems and for every part search. As a result, latent part unavailability continues to be a problem in the recycled part industry. This has challenged independent recyclers to find a mechanism to present not only the widest possible variety of parts, but certainty of delivery of those parts through centralized databases such as car-part.com, notwithstanding the many various factors mentioned above which create the potential that a particular part, while presented in a centralized database, is actually unavailable.

As a result of the factors discussed above and because of resulting administrative efficiencies, body shops have come to prefer to obtain as many parts as possible from a single parts supplier that can be relied upon to deliver a wide variety of parts with a committed timing. This has challenged recyclers to provide their customers with the widest possible variety of parts, as well as certainty of delivery of those parts, notwithstanding the many various factors mentioned above which can affect the potential that a particular part can be obtained and delivered at a defined time. To compete for business, auto recyclers have expanded their brokering relationships with other part suppliers (including other auto recyclers, aftermarket part suppliers, and/or original equipment part providers) in order to be able meet all of the needs of their body shop customers. However, this increases the challenge to recyclers of managing the process of collecting parts from various locations (from local physical inventory and/or from one or more suppliers via a brokering relationship) and delivering such parts to the body shop within the required delivery time committed to the body shop.

In short, the auto recycler is effectively a part supplier to a repair shop assembly line where the margins for error are very low and each part in the supply chain is unique. In this environment, the auto recycler has unique challenges. Because each part is unique and coming from a limited supply of salvage vehicles, if the recycler is unable to supply a part the buyer chose, the recycler may not be able to supply an alternatively acceptable part to the buyer, even though there may be interchangeable parts, due to different colors, damage levels, accessories, and the like. Similarly, the recycler has the best opportunity to sell parts by exposing all of the individual parts in the recycler's supply chain to buyers such as shops (and insurers), even though by doing so the recycler may be required to take uneconomic steps to obtain a given part in view of its relative value, profit margin, distance and shipping cost. Furthermore, the recycler needs to accurately estimate and commit to dates that parts from a wide variety of supply chains can be delivered to the repair shop, since the part is to be used in mini production line that changes for each vehicle.

As a consequence of the complexities in delivery and logistics of part delivery, major parts purchasers such as insurance companies have faced a significant challenge in their efforts to include the full available inventory of recycled parts in repair estimates. There is a significant need, however, to include recycled parts in such estimates because of the reduction of cost that can be realized, without loss of quality. In some cases, part buyers have limited their purchasing only to a small number of suppliers who hold parts in their own inventory, because those suppliers have more predictable delivery times and performance. This has, in turn, constrained the marketplace for recycled parts and reduced competition and increased prices to the end consumer.

SUMMARY OF THE INVENTION

As a result of all of the factors discussed above, supply chain management for auto repair is fundamentally different from normal supply chain logistics, because individual and unique parts throughout a supply chain are exposed to and acquired by buyers. When a buyer orders parts to repair a vehicle, the entities that supply those parts must in effect dynamically create a unique supply chain for that order, and thereafter create a new unique supply chain with each subsequent vehicle that is repaired. All of the complexities of each individual recycler's supply chain for each individual part need to be factored into delivery calculations and commitments for each part being delivered to each individual shop, so that the shop can in turn control its own supply chain of vehicles needing repair.

The present invention addresses these issues by giving recyclers the ability to accurately estimate and commit to delivery times for an expanded set of unique parts that they deliver to their buyers, notwithstanding whether those parts are in the recycler's own inventory or in the inventory of other parts suppliers or sources. Furthermore, the present invention gives recyclers the ability to expand the inventory they present to buyers by including unique parts they broker from parts suppliers, but do so in a controlled fashion based on criteria set by the supplier or broker that can steer part purchases toward preferred partners and avoid transactions that are uneconomic due to large distances or shipping costs, and/or small part values or quantities.

The present invention has the object of addressing these limitations in the vehicle parts market by a comprehensively characterizing the recycled part delivery process in a way that enables an accurate commitment of recycled part delivery time, and delivery times of other kinds of vehicle parts, and the numerous factors which can affect this time based on the wide variations of parameters in the various supply chains, enabling computation of a delivery time for a greater number of parts and circumstances than has previously been accomplished. A system practicing the invention can thus present a wider selection of parts that meet the delivery time criteria of a buyer than has previously been possible, improving the decision making of parts buyers and reducing associated costs and inefficiencies.

The invention provides this functionality by accounting for several nuances in the manner in which parts are supplied, specifically:

Part suppliers limit the type of buyers they deliver to, areas in which parts are delivered, the kinds of parts they deliver to certain areas, and will conditionally deliver parts to some areas based upon a minimum order size, geographic density, or preference to particular partners;

Part suppliers have varying parameters affecting the time required to obtain a particular type of part from inventory and put it on a delivery vehicle;

Part suppliers have additional parameters that affect the number of business days required to accomplish the steps to move a part from inventory and put it on a delivery vehicle;

Part brokers use their own criteria for computing delivery times of parts they broker from particular part suppliers to account for experience with that particular supplier and possible underestimation by the supplier of the actual delivery time including assigning different priorities when the part is going to a broker instead of a native buyer like a repair shop.

By addressing these factors in a comprehensive manner, the invention can generate accurate estimates of part delivery time from the widest possible array of sources for parts, not limited to particular suppliers or particular classes of suppliers.

In one aspect, the invention comprises a method for improving the presentation of vehicle parts for sale to a buyer, where at least some of the parts are recycled parts that require dismantling from a source vehicle, comprising computing delivery times for a plurality of parts, the plurality of parts including parts requiring dismantling from a source vehicle in a vehicle salvage yard.

Herein, to avoid ambiguity, the term "dismantling" will be used to refer to the process of separating a part from its source vehicle, which may involve the unbolting of the part, cutting the part off the vehicle, or a combination of both, or may simply involve the retrieval from the source vehicle of a part that has already been unbolted or otherwise separated from the source vehicle but is stored with the source vehicle. "Dismantling" thus refers to kind of the production work required for parts that are typically coded in an inventory management system with the location codes [U], [Y] or, where supported, [dis] or [V].

Also, to avoid ambiguity, the term "delivery time" will be used to refer to a time of delivery stated as a calendar day, or any more specific time such as "afternoon" or "morning" or a particular hour or hour and minute of the day.

In particular embodiments of the aspect, the plurality of parts include parts which do not require dismantling, e.g., are located in a warehouse, and those parts are also associated with a delivery time. Also, the plurality of parts may include parts which are located at the facility of a part broker, parts which are located at a facility of a part supplier who supplies parts to a part broker, and parts which are located at a facility of a part source who supplies parts to a part supplier who then supplies parts to a part broker.

In a second aspect, the invention features a method of presenting to a buyer, vehicle parts available from a part supplier through a plurality part brokers, comprising obtaining criteria from one or both of the supplier and brokers, and based upon the criteria, presenting the part as available from either the first broker, the second broker, only one of the brokers, or both of the brokers.

In particular embodiments of this aspect, the criteria comprise an identification of part types that a broker wishes to broker from the part supplier, or an identification of part types that the part supplier is willing to have brokered by a broker. The criteria can also comprise a part supplier's preference to have parts brokered by the first broker instead of the second broker. The criteria can preclude presentation of parts, or cause parts to be preferentially presented as available from a preferred broker over another broker. A preference criteria, however, will not prevent the presentation of a part through a non-preferred broker when the preferred broker is otherwise disqualified from presentation, e.g., due to a buyer being outside the preferred broker's delivery area, or the part type not being brokered by the preferred broker.

Embodiments of this aspect the invention apply brokering of parts that require dismantling as well as parts that do not require dismantling (which may be recycled, OEM or aftermarket parts), and further, embodiments of this aspect apply to parts which are brokered at multiple levels, i.e., brokered from suppliers who themselves obtain the parts from a third party source.

Filtering provides various advantages to a brokering yard, most particularly enabling the broker to present its customers with only unique parts that add to the broker's inventory, i.e., only recycled parts, recycled parts of a kind not regularly in the brokers inventory, or other individually unique parts such as blemished original equipment (OEM) parts, without presenting the entire inventory of a supplier yard to the broker's customers. For example, filtering may be used to remove aftermarket or new OEM parts, or other parts readily available to the broker, so that those parts, although in the supplier yard inventory, are not shown to the broker's buyer. This is an advantage because the broker does not need to broker the common parts from his recycler suppliers because he can broker the common parts from his own source and eliminate a middle man. The ability to select unique parts and quality unique parts and high dollar parts and part types while rejecting classes of parts that are common, provides a robust capability that separates out the valuable from the commodity and enhances the overall usefulness of the system and increases the overall availability without cluttering search results. Filtering also provides advantages to the supplier yard, enabling the supplier yard to refuse brokering of parts that it believes can be sold to direct customers at higher prices than the transfer prices jto a brokering yard. Filtering also allows a broker to select only the "grade A" or best quality parts that are normally specified for insurance repair work, and limit brokering to part types that are often in short supply or otherwise unique.

In accordance with a third aspect, the invention features a combination of the above aspects, specifically, a system and method which provides delivery time data for parts which must be dismantled as well as parts which do not require dismantling, and which enables the use of broker criteria to control the presentation of parts. Embodiments of this combined concept include the various features of the aspects identified above.

In accordance with principles of the present invention, the difficulties in the used parts market described above are additionally addressed by the implementation of a part availability verification method for a centralized inventory system. The centralized inventory system compiles a database of recycled car parts via regular synchronization with plural independent inventory systems. The method enables the real-time verification of the actual availability of a part selected from that compiled database, by formulating a real-time query to the independent inventory system identified as carrying the selected part, in order to verify the current availability of the selected part.

In the particular embodiment described herein, the method and resulting real-time query are performed only for certain search results generated from the centralized inventory system, based on particular actions of a user, such as an explicit verification request action (such as clicking a verify button), or an action implicitly requiring verification (such as adding a part to an estimate, adding a part to a shopping cart, ordering a part, a user requesting to modify or check out a virtual shopping cart of parts). Alternatively, or in addition, verification could be automatically performed, for example for the first n results in a search, where for example n=8. In this particular embodiment the results of a verification are broadcast to computing systems of the seller and potential buyer associated with the verification request to enable audit and follow-up by either the seller or potential buyer on the verification request. (As used herein, "potential buyer" refers to any party that may buy a part, for him/her/itself or on behalf of another person, and/or to any party that gathers information about a potential purchase for another party, and/or gathers such information as part of creating or auditing an estimate of a purchase price, whether or not that estimate is used to make actual purchases.)

The system disclosed herein is compatible with the brokerage of parts; for brokered parts, the system formulates a real-time query to the inventory management system of the part supplier, even though the part is selected for purchase and verification from a part broker and not be sold directly from the part supplier. The verification information is thus accurately representative of the availability of the part from its ultimate supplier. Moreover, in the case of a brokered part, part verifications are broadcast to the part seller that is brokering the part, instead of or in addition to the part supplier.

The system is further responsive to a re-verification request from a seller, broker, or potential buyer of a part to reconfirm a previous verification, such as a previously broadcast verification that is included in a verification audit record.

The system implements part verification by computing a checksum of data regarding a part in the centralized inventory system and delivering that checksum to the independent inventory system for comparison to a checksum of the data at the independent inventory system.

The system further implements automatic version control upon the inventory management systems, by maintaining a database identifying the current version in use at the independent inventory system, so that the centralized inventory system may reference this database and compute a checksum with the same version number as is in use in the independent inventory management system and provide the same to for comparison.

BRIEF DESCRIPTION OF THE DRAWINGS

The invention will be more clearly understood from the following detailed description of representative embodiments thereof read in conjunction with the accompanying drawings that form a part of this disclosure.

DETAILED DESCRIPTION OF THE INVENTION

Figure 1:
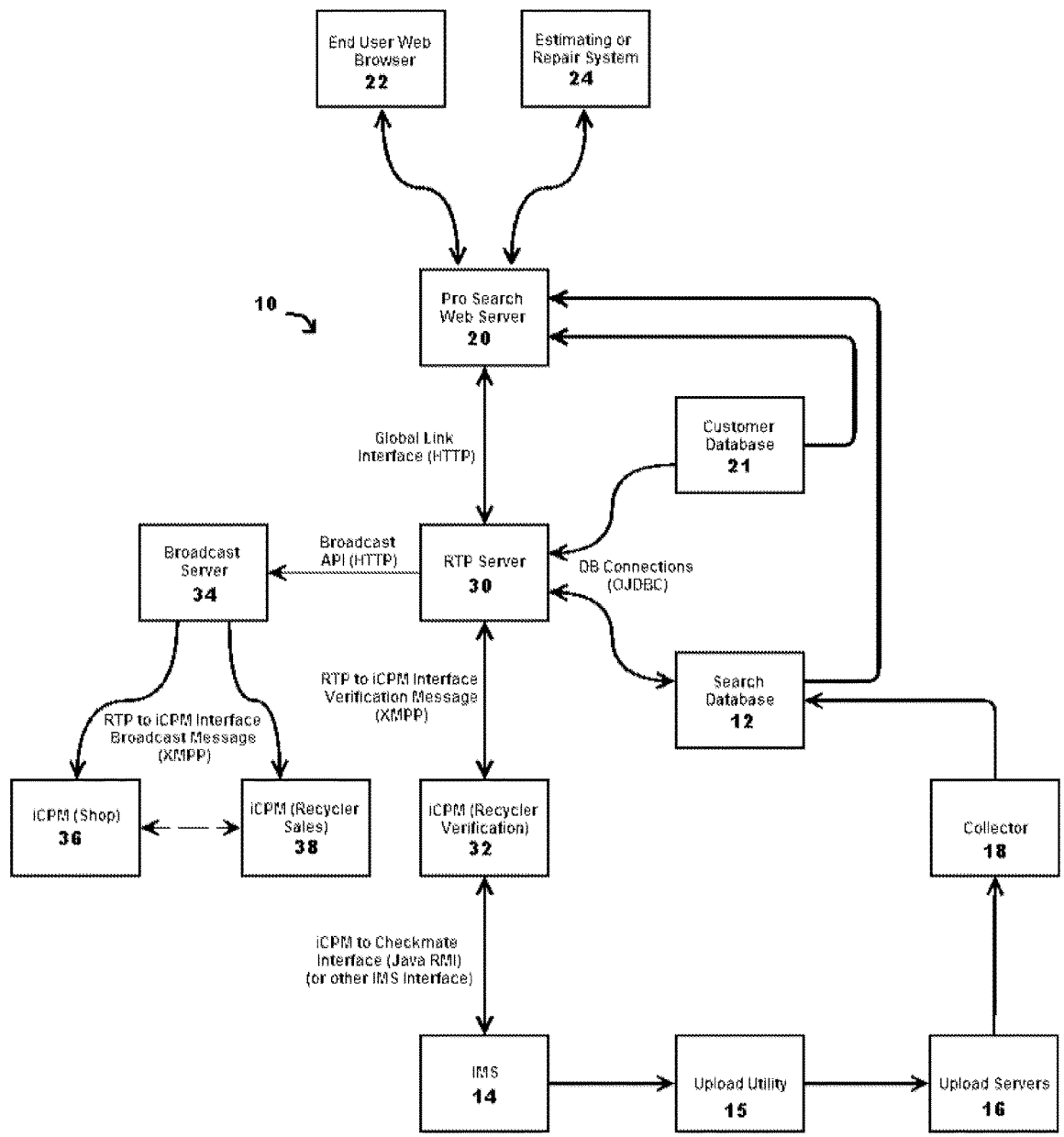
FIG. 1 is an overall system diagram illustrating a centralized used car parts inventory system that includes features and functions for real time verification of part availability.

FIG. 1 is a high-level diagram showing an embodiment of a system 10 for handling recycled part information in accordance with principles of the present invention, illustrating the components that handle recycled part information and the flow of part information through the system. In one embodiment, the illustrated systems are connected and communicate with an XMPP (extensible Messaging and Presence Protocol) instant messaging infrastructure, supported by instant message clusters. For the purposes of simplicity and clarity the XMPP servers (for example, 10 IM clusters embracing 60 or more servers) are considered a background infrastructure available for all services and not independently illustrated in FIG. 1. In alternative embodiments of the invention the messaging infrastructure connecting the systems described herein could be other than XMPP instant messaging, e.g., intercommunication could use email, small message service (SMS aka text messaging), social networking (e.g., Twitter) or any other communications platform/medium. As used herein "instant messaging" and related terms such as "broadcast" and "message" should be understood to refer to any platform that supports message passing not limited to the particular embodiment disclosed herein.

At the core of the system is a search database 12, which contains a database of recycled parts compiled from disparate auto recycler part inventory management systems (IMSs) such as IMS 14. As is known in the art, the search database 12 is compiled on a regular, e.g., nightly basis, by the operation of an upload utility 15 which gathers a full or incremental image of the database of parts in IMS 14 and delivers this database image to an upload server in a server farm 16. This activity is performed nightly for numerous disparate IMS's across a wide geographical area, each using an appropriate upload utility 15 to gather the requisite data in a form appropriate for that IMS. Data is gathered by upload servers 16 which, among other functions, harmonizes the collected data to a standard format (including without limitation compiling information from vehicle records which contain part information that may be relevant in the locating, verification, and/or procurement of parts). The data is then assembled by a collector server 18 which aggregates part tables built from uploaded data and loads the data into the search database. Notably, the tables in the search database can include several elements of information not found in the original source data from the disparate IMS platforms; for example, delivery time prediction information can be compiled into the database to enable searches to be performed with a delivery time criterion; this functionality is elaborated extensively in the above-referenced and incorporated US patent application of the assignee.

Parts and inventory entries logged into search database 12 are presented to users as search results via one of several interfaces, including, for example, a web server 22 hosting a web site such as the assignee's public web site car-part.com, assignee's subscription web site "Car-Part Pro", and/or individual recycler websites using inventory results provided by the assignee. Additional venues where search results may be presented to users include parts provider inventory and/or point of sale systems, estimating, or repair shop management systems 24, third party systems including claims work flow systems which are loaded with or access recycled part inventory data from the search database 12, typically via access to a web server, for the purpose of estimating vehicle repairs, managing vehicle repairs, coordinating the sale, brokering or delivery of parts, managing insurance claims relating to vehicle repairs, and other functions. These various applications work in conjunction with customer information (such as log-in data, search preferences/filters, or subscription, contact and payment information) stored in a customer database 21.

The present disclosure is directed to the implementation of a real time part (RTP) verification protocol that runs in parallel with the regular/nightly upload of part data by the systems described above, to overcome the latency (nightly build/load) in the search database 12 that is described above. This protocol is implemented through an RTP server 30 which links (directly or indirectly) to additional servers at part supplier locations, as well as instant messaging clients at potential buyer and seller locations (used to display verification information), as will be described in greater detail below.

Specifically, the RTP Server 30 connects via an HTTP or HTTPS global link interface to web server 20 to receive a request for part verification. This request may be in response to an explicit user action, e.g., the user may be presented with a button to request verification of current availability of a part, or an executable script or program may run which verifies current availability of parts upon user activity such as adding a part to an estimate, adding a part to a repair order, inclusion of a part in a third party system such as a claims workflow, movement of parts to a virtual shopping cart or the initiation of checkout of such a cart. Alternatively, or in addition, verification could be automatically performed for parts that are likely to be purchased, for example for the first n results in a search performed by a professional buyer, where for example n=8 or n=20. The RTP server passes instructions 46 to the part supplier's IMS 14 (or software that operates on behalf of the IMS), using the verification iCPM platform 32 as a pass-through entity which maintains the active connection to the IMS or surrogate software. The instructions 46 indicate that a verification needs to be performed and include all relevant fields.

The verification result, or a failure to verify notification, flows back from IMS (or software that operates on behalf of the IMS) 14 to instant messaging platform 32, and then to RTP server 30, which delivers that verification or failure notice over the HTTP/HTTPS channel to the web server 20 so that it may be presented to the user via the browser 22 or management system 24 that originated the request.

Further, in the illustrated embodiment, after a verification event, the RTP server initiates a broadcast protocol in connection with a broadcast server 34 to provide audit and follow-up information to the involved part seller and part purchaser. Finally, the broadcast server forwards this information to the potential buyer's iCPM client 36 (for example, to a shop or insurance appraiser) and/or to the seller's iCPM client(s) 38 (for example, to a recycler's sales people).

As noted above, a number of brokering relationships may be formed such that parts from a given supplier are available directly and/or through brokers. In that case, part verification as described above is done with the part supplier's IMS 14, not the part broker, since the part supplier has the accurate and current information on the part. However, in the case where a potential part buyer has selected a brokered part (typically because of a relationship between the potential buyer and broker that simplifies the potential buyer's logistics) when the verification result is broadcast as described above, it is delivered to the sales staff of the part broker, rather than the staff of the part supplier, so that the broker can fulfill the traditional relationship of brokering the part and handling for the potential buyer any part quality or delivery variances that caused a verification failure.

Figure 2:
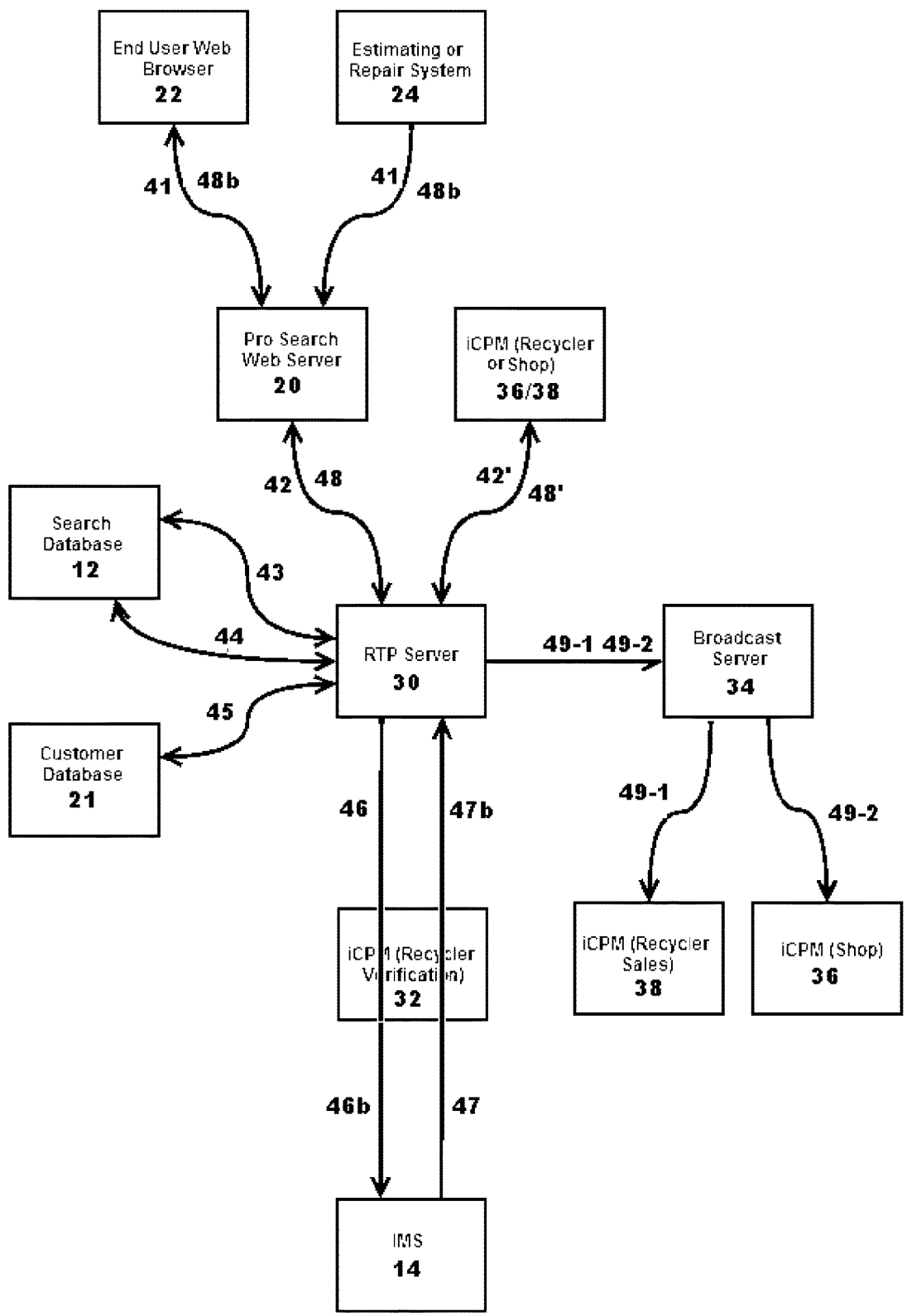
FIG. 2 is a flow diagram more specifically illustrating the use of the components of FIG. 1 in the real time verification of part availability.

Turning now to FIG. 2, a more detailed description can be provided of the data and control flow involved in a real time verification in accordance with the disclosed particular embodiment of the invention. FIG. 2 illustrates the components and systems of FIG. 1 which are involved in a real time verification, but for the purpose of clarity arranged in a process flow arrangement rather than a geographical or system topography arrangement. The data flow events are labeled with reference numerals to facilitate the following discussion.

A customer can initiate RTP verification from search results displayed by web server 20 on a web browser 22, through an integrated system 24, or through an instant messaging client such as iCPM client 36/38. The former is initiated from a search result, which is obtained, e.g., when a customer performs a manual part search through their web browser 22, obtaining search results. Alternatively, search results from web server 20 can be viewed through an integration interface in an estimating/repair/work flow system 24 of the kind used to estimate repair of a damaged vehicle or manage the vehicle repair process. In either case, on the search results, a part verification link (in the form of a button) is written to the page for each part record. When the customer activates this link, a part verification is initiated by a verification message 41. Verification could also occur automatically in response to user activity such as adding a part to an estimate or a repair order, selecting a part for inclusion into a third-party system, movement of a part into a cart, initiation of checkout, or the like, or could be performed automatically, for example, for some search results such as the first n. In a responsive communication 42, the search web server then sends a verification request to the RTP server, including key information: part GUID (globally unique ID), checksum, checksum version, broker ID, and supplier ID. Search details are also included, as well as some other identifier fields, as will be elaborated below with respect to the global part link specification in Table I attached to this specification.

A verification request can also "re-verify" a previous part request; for example, a "re-verify" request 42' could be generated by an instant message application at, for example, a recycler or repair shop, to follow up on a verification result previously broadcast to that shop. This functionality is provided to permit the re-affirmation of verified parts which appear in an audit trail generated by the process about to be described (e.g., through a "verify" tab in an instant message application which shows previously completed part verification results). The verification request 42 or 42', whether generated from part search results or through a re-verify request, uses a universal part identifier to identify the part of interest, having the data fields elaborated below and in Table I. Re-verify requests differ from verify requests in that they contain a transaction reference to previous verification(s) to enable the re-verify to be related to its predecessor verification(s).

Responding to a verification request 42 or re-verify request 42', the RTP server 30 first reconfirms the verified part in the search database 12 via a database query 43. As the customer search could have been performed substantially before the verification is initiated, the RTP server contacts the part database with query 43 to make sure the part being verified still exists in the search database. The query response 44 will either confirm the part and part details, or indicate the part is no longer in the database. If the part does not exist, the RTP server immediately returns that the part is unavailable, skipping all other steps. In the case that the request 42 or 42' identifies a valid part to verify, the responsive message 44 to the RTP server communicates additional part information from the search database that enables complete verification; the specific data exchange is elaborated below and in Tables IIA and IIB.

After receipt of search database information, the RTP server also retrieves additional information about the recycler and the customer (end user) from the customer database 21 using a message exchange 45; the specific data is elaborated in the RTP to IMS (via iCPM) field specification in Table IIA attached to this specification. This information includes the verification and broadcast JIDs (instant messaging user IDs) required for the remainder of the process. Verification JID(s) indicate which messaging accounts are used to do the verification. Broadcast JID(s) are used to identify the user messaging accounts which receive verification results in the broadcast steps.

RTP server 30 further communicates, via an instant messaging protocol such as XMPP, with a recycler's verification-enabled instant messaging platform 32 (also known as an instant Car-Part messaging platform or iCPM) that is in communication with the recycler's IMS 14. Alternatively, the recycler's iCPM communicates with software that operates on behalf of the IMS (e.g., for those IMS systems that do not natively support real time part verification functions such as checksum computation). In the case where alternative software is used in conjunction with the IMS, messaging will communicate with that software using the same principles as discussed herein referencing direct communication with the IMS. Specifically, the RTP server 30 passes instructions 46 required to perform the verification. These instructions are delivered to the IMS/surrogate software via iCPM-iCPM acts as a pass-through entity, passing on the information as an instruction 46b to the IMS/surrogate software 14. iCPM 32 maintains a persistent connection to the centralized servers, which provides access to software within the recycler facility. Additionally, iCPM 32 manages the interface and persistent connection to the IMS/surrogate software 14, which is unique to the type of IMS. Once contacted by the RTP server 30, iCPM 32 then performs a query 46b at the recycler IMS/surrogate software 14 to collect information needed to verify the continued availability of the identified part, without changes as compared to the presentation of the part in the search database 12 (e.g., no price, condition or location changes). The key part verification fields supplied to the IMS/surrogate software 14 are GUID and checksum version. In one example of the iCPM to IMS connection, applicable to the assignee's "Checkmate" Inventory Management System, the instant message platform 32 leverages JDBC to make a stored procedure call at the recycler IMS 14, which performs a query against the IMS database to gather information which is used to calculate the checksum of the part being verified.

The IMS/surrogate software 14 finds the part specified by the GUID and uses the designated checksum version to compute a checksum, and returns the checksum to iCPM platform 32, in a message 47 (see Table IIB attached to this specification). iCPM again acts as a pass-through entity, managing the connection to the RTP server, and forwards the result message 47b on to the RTP server 30.

The RTP server 30 uses the information to make a determination on the verification, with one of four possible results:

The part is available (part is available and nothing critical, such as price, has changed)
The part is unavailable
The part is "probably" available (part is available but something potentially important has changed), or
The verification service is unavailable (the part verification failed to complete successfully).

The RTP server 30 returns this result in a result message 48 or 48'. In the case of an initial verification, the result 48 is delivered to the web server 20, which then returns the results back to the end user (at a browser or estimating/repair/work flow/inventory system) in a derivative results report 48b. Alternatively, in the case of a re-verify, such as one issued from an iCPM instant messenger platform 38 at a recycler or shop, the RTP server returns a results report 48' back to the issuing iCPM platform 38. Re-verify responses 48' differ from initial verify responses 48 in that re-verify responses 48' contain a transaction reference to previous verification(s) to enable the re-verify to be related to its predecessor verification(s).

In addition to the above reporting steps, the RTP server 30 sends two requests 49-1, 49-2 to the Broadcast server 34, to broadcast the verification results out to the iCPM platforms at the selling recycler, and to the iCPM platforms at the potential buyer, e.g., the requesting repair shop. Specifically, using a RTP broadcast API, which in this particular embodiment is implemented with HTTP, a broadcast message regarding the (successful or failed) verification is delivered to a Broadcast Server 34, along with the appropriate instant messaging identities to be notified at the prospective part purchaser and part seller. The broadcast server issues a corresponding instant message with the details of the part search and part verification to the one or more instant messaging accounts at the prospective part buyer and seller, and in appropriate cases to a support representative (in the event of a failed verification). The potential part buyer thus has information in the form of an audit trail of parts that have been verified and the context in which this was done, for later follow-up in the event a part is not purchased. Also, the part seller staff has information on specific inquiries about that seller's listed parts and an indication of the context of the inquiry to enable follow-up in the event a part is not sold. Most particularly, this information permits seller staff to proactively attempt to make a sale to the potential buyer, potentially through actions such as communication of a decreased price or increase in the available service level (such as faster delivery time), or informing the potential buyer that, despite a discouraging verification result such as "probably available" or "not available", the seller can possibly still provide an acceptable part and level of service. The seller can also react to failures indicating technical faults in the verification process to get service restored. (Particular types of verification results are described in greater detail below.) Broadcast messages to the potential buyer and part seller also differ in the event the verification was a re-verify in that re-verify broadcasts contain a transaction reference to previous verification(s) to enable the re-verify to be related to its predecessor verification(s).

The same set of fields is used for broadcasts 49-1 and 49-2; however, different fields are populated in the two broadcasts, as some information is not displayed to the seller or potential buyer (such as seller/buyer contact information) and thus not used in broadcast 49-1 or 49-2, respectively. After the broadcast server 34 sends the verification results 49-1 and 49-2 to the corresponding seller's iCPM client(s) 38 and potential buyer's iCPM client 36, these display the verification results for audit and follow-up, e.g., in a verification tab within iCPM. In the event the verification was initiated from iCPM as a re-verify, the existing verification entry is updated to reflect the updated status and indicates multiple verifications have occurred. A part can be re-verified numerous times, if necessary.

The communications described above utilize a construct known as a Universal Part Link (UPL) to securely transfer part, search, and search result information from one application to another. The primary source of data in a part link construct is a search result, but a part link can also be created from any source that has the required information. The objectives of the UPL are:

Neatly and securely pack the relevant data necessary for transfer to another application
Store any information specific to the search result itself-such as the delivery time of the part, which can change from one minute to the next, or the total part price, which is a complex aggregate, resulting from the combination of many prices, such as part price, delivery fee, warranty fee, broker fee, etc. These price components, which are not visible on the search result, are also stored. This data is stored in the link displayed so that another application call (such as a part verification) does not generate new values, which may not match the values presented to the user
Store relevant information about the part, the potential buyer, the supplier, and the broker-such as the part GUID, the potential buyer exchange rate, the supplier ID, and the broker ID, respectively Store information about the search parameters, that may be valuable to present elsewhere (for example, when a part is verified, the seller broadcast includes the search parameters, so that the seller is aware of the needs of the potential buyer)

Table I attached hereto provides the field specifications for the UPL.

A second construct used in the communications described above is known as the RTP-IMS (via iCPM) messaging construct. The fields of this construct are shown in the attached Table II; the key fields are a GUID and a checksum version. These fields are passed to an iCPM platform as an arguments string used to make a call to the IMS. The call into the IMS, in the case of a Checkmate IMS, forms a query from the GUID, and returns the checksum for the part with the supplied GUID, using the appropriate checksum logic based on the checksum version supplied with the message. Additional fields may also be included in future implementations such as the quantity of parts (when multiple identical parts are inventoried together with a quantity field).

A final construct used in communication is known as the RTP-iCPM broadcast message, which is delivered as message 49-1 or 49-2 to broadcast verification results. These broadcasts include the verification result (yes, no, probably, service unavailable), potential buyer and seller contact information (if appropriate), as well as information about the part, the search results (such as number of delivery days displayed at the time of the search), and in the case of the seller, the search parameters, the price breakdown, and brokering information. Note that "service unavailable" messages are also broadcast to support representatives. Support broadcasts only occur when there is a service failure, not in the expected case of a successful verification.

Version control/management is a significant challenge in the verification system described herein. There are two aspects in which version incompatibility may arise: interface versions and checksum versions.

Issues with interface versions arise from the fact that the RTP server, iCPM platforms and the IMS/surrogate software may all be upgraded independently of each other. The iCPM and IMS/surrogate software upgrade processes are heavyweight processes and thus are completed over a period of time, rather that instantaneously. This means there will not be version consistency across the enterprise of computing hardware/systems in which the present invention operates. Notably, interface versions, not the software versions, are the focus of the concern with the independent platforms, but because interface updates occur with software updates, the software version on a platform can be used as a proxy for the interface version.

As to checksum versions, the information and logic used to calculate the checksum of a part changes over time. A checksum for a part will be different for different versions of the checksum logic, even if all the part information is the same. With multiple sources of data-IMS databases of parts, and the central database of parts—it is critical to track and manage the checksum version used to compute the checksum of parts so that those checksums are compatible.

The following steps explain, at a high level, how these different versions are managed.

Periodically (e.g., every 20 seconds), each iCPM 32 coupled to an IMS or surrogate software checks its connection by requesting the IMS/surrogate software 14 version. Less periodically (e.g., every 1 hour), each IMS-connected iCPM checks in to an iCPM web services server and provides the IMS/surrogate software version as well as the iCPM version. In response to this communication, the iCPM web services server updates the customer database 21 with the iCPM and IMS version information.

When a verification request is initiated, RTP server 30 obtains the iCPM 32 and IMS/surrogate software 14 version information from the customer database 21 as part of message exchange 45 (FIG. 2). Before constructing the message 46 it will send to iCPM, the RTP server must consider the RTP version, the iCPM version, and the IMS/surrogate software version, to identify the minimum interface version supported by all three. There is also a minimum version level that is still allowed to be used by the system as a whole-older versions may not be allowed for any number of reasons (security, lack of required functionality, etc.). Assuming all software/interface versions are sufficient to complete a request, the RTP server 30 will construct a verification message 46, including the interface version to be used. The RTP server keeps multiple sets of logic, to allow it to construct older request formats, to handle cases when iCPM platform 32 or the IMS 14 are not up to date with the RTP server. The RTP server also supplies, in message 46, the checksum version that was used to compute the checksum at the time it was uploaded to the search database 12.

The iCPM platform 32 also maintains multiple sets of logic, to allow it to handle older request formats, and uses the interface version supplied by the RTP server 30 to identify which set of logic is needed to make the correct procedure call, to pass the information to the IMS/surrogate software 14. The information is then appropriately sent to the IMS/surrogate software.

The IMS/surrogate software 14 also maintains multiple sets of communication logic (for communication to/from iCPM platform 32), to allow it to handle older request formats. Additionally, the IMS/surrogate software must maintain multiple versions of checksum computation logic, as the version of the interface used for communication and the version of the checksum logic can change independently. The IMS/surrogate software computes the checksum of the part, using the supplied checksum version, and then uses the appropriate version of the interface to return the information back to iCPM platform 32 in message 47.

Finally, iCPM 32 uses the appropriate version of the interface to return the information in message 47b back to the RTP server 30.

If the iCPM platform 32 or the IMS/surrogate software 14 is too dated to complete a procedure call, or if there is a version mismatch resulting from the slight delays in the propagation of version information, the RTP server 30 delivers the version mismatch information through iCPM, per an instant message, to the appropriate support technician so that the problem can be resolved. Additionally, the RTP server logs this information back to the customer database 21.

For illustration purposes, here are some examples of scenarios and how they are handled by this version control logic:

The RTP server 30, iCPM 32 and the IMS/surrogate software 14 are all on the same version, in which new checksum logic was implemented. The IMS/surrogate software was just updated today, so the part in the search database was uploaded yesterday using the old checksum logic. Even though all parties can all support the latest checksum logic, the RTP server has to pass down part information with a checksum compatible with the checksum version in the customer database 21. The IMS/surrogate software maintains the old checksum logic, and therefore is able to compute the checksum for the part using the old logic, allowing the system to determine whether anything has changed on the part.

The RTP server 30 is updated with a new version of the RTP software, which includes an updated version of the interface with a useful new field. iCPM 32 and the IMS/surrogate software 14 are still on the old version of the interface. When an RTP verification comes through, constructing a message with the new field would result in an error when iCPM processes the message. However, RTP checks the database, determines iCPM and the IMS/surrogate software are on the older version, RTP constructs the message with the older version, allowing for a successful verification.

The RTP server 30 has been updated with the new version of RTP software for some time. Additionally, the roll out of the new iCPM 32 version has been completed. However, one recycler has not updated its IMS/surrogate software 14 in a year. The new version of RTP server and iCPM software includes a new interface version, which has a vital new field added. If the RTP server were to construct a message on the current version, it would fail when iCPM tried to communicate with the IMS/surrogate software. If the RTP server were to construct a message using the older version, the call could succeed, but vital information, which is required for a quality user experience in the current environment, would be missing. When the RTP server checks the customer database 21 and determines the IMS/surrogate software does not meet the minimum standards, RTP informs a Car-Part support technician of the problem, allowing them to contact the customer to fix the problem, which allows full RTP functionality to be restored relatively quickly.

Figure 3:
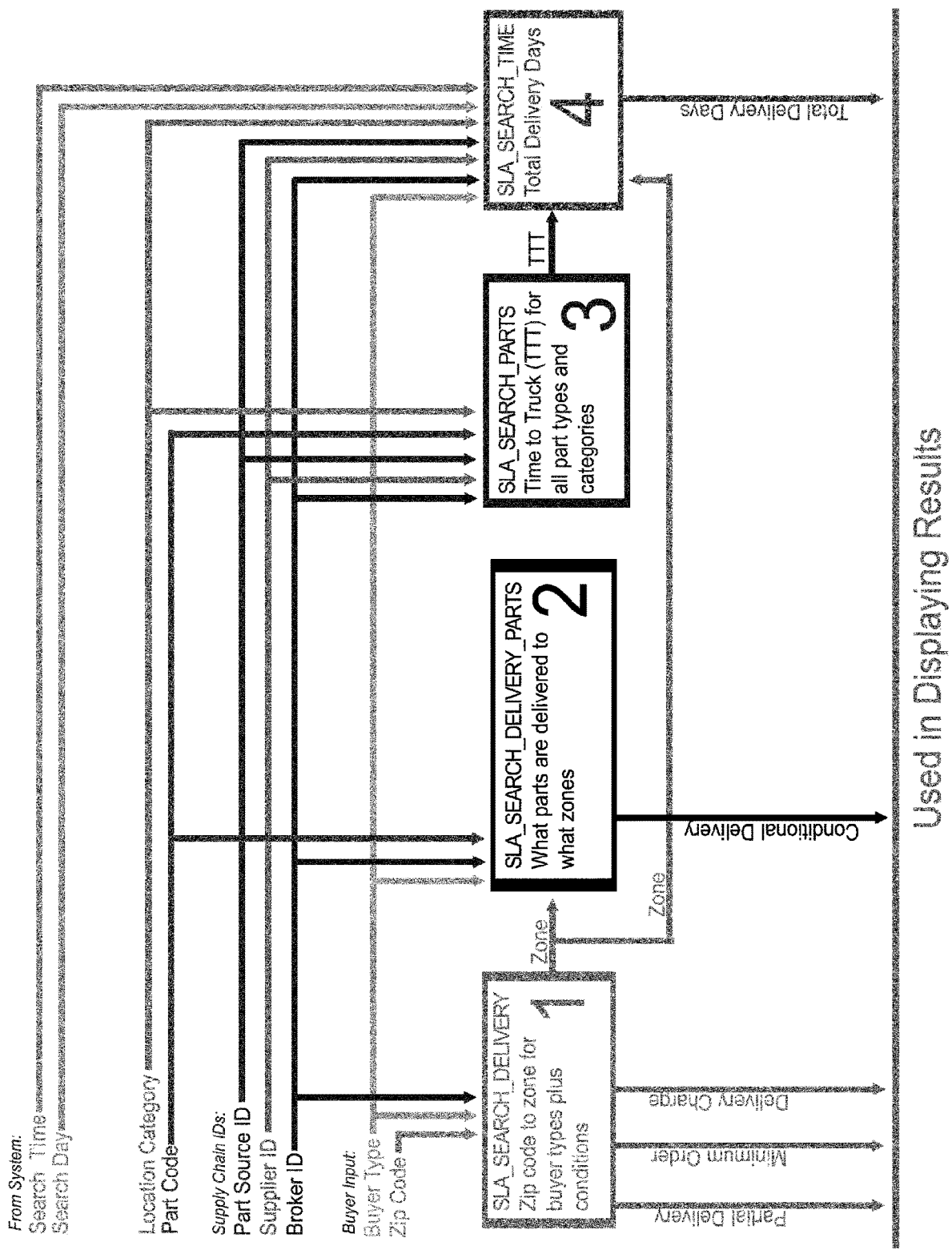
FIG. 3 is a data flow chart showing the use of the four tables SLA_SEARCH_DELIVERY, SLA_SEARCH_DELIVERY_PARTS, SLA_SEARCH_PARTS and SLA_SEARCH_TIME to generate an estimate of total delivery days for a part given the buyer information, part information, and the time and day that a part search is being conducted.
Figure 5:
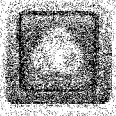
FIGS. 5-66 are illustrations of the process for gathering and storing data for the four tables shown in FIG. 3.
Figure 7:
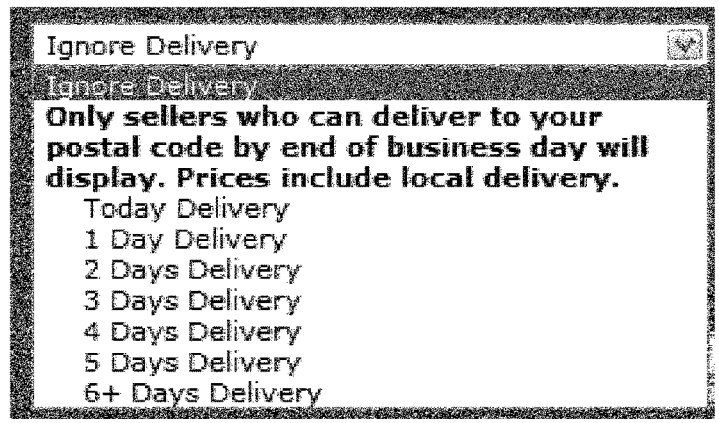
Figure 8:
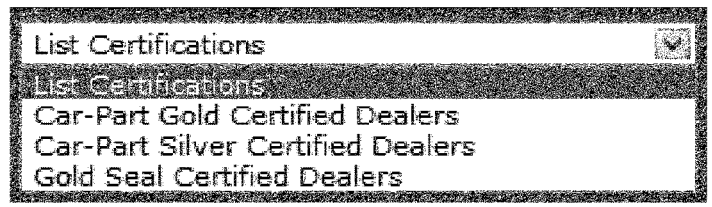
Figure 9:
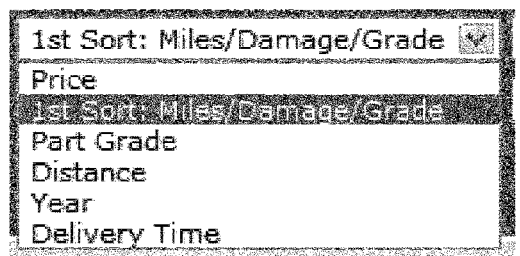
Figure 10:
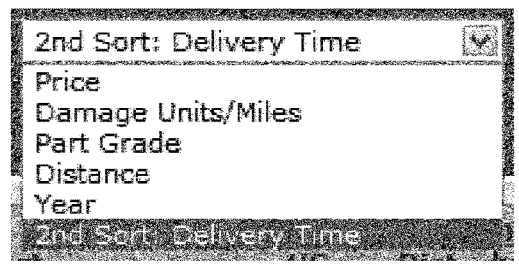
Figure 11:
Figure 12:
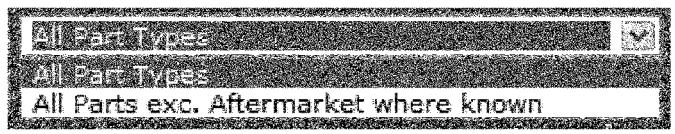
Figure 13:
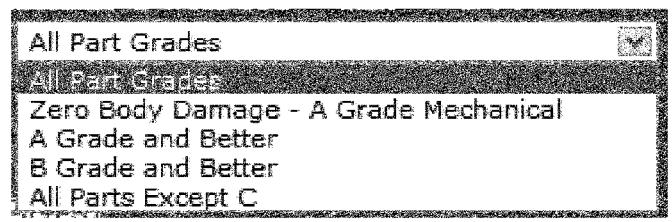
Figure 14:
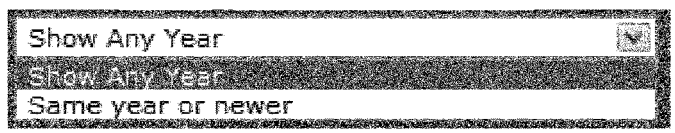
Figure 15:
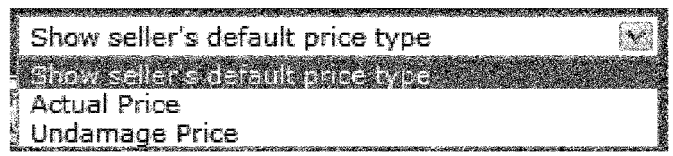
Figure 19:
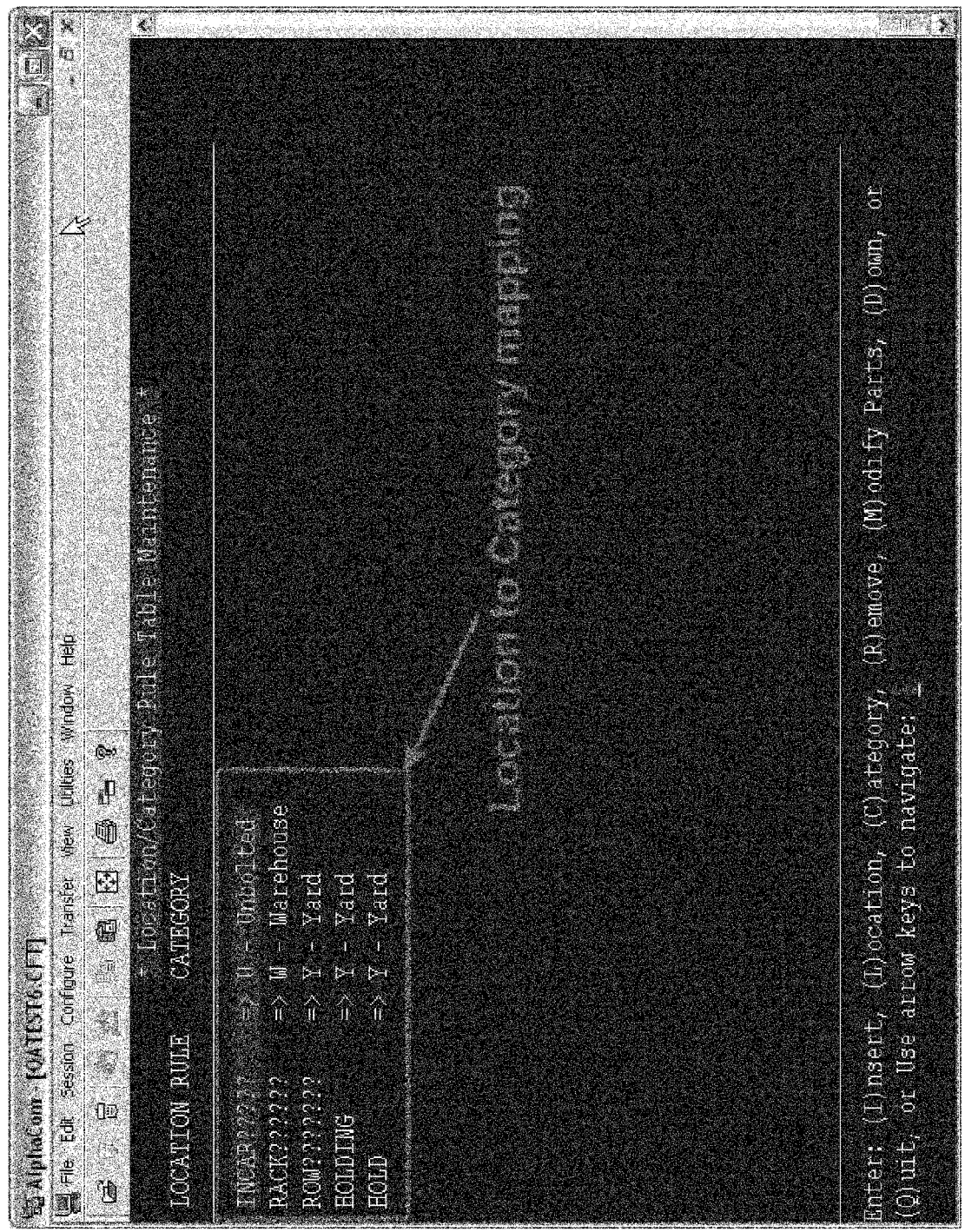
Figure 20:
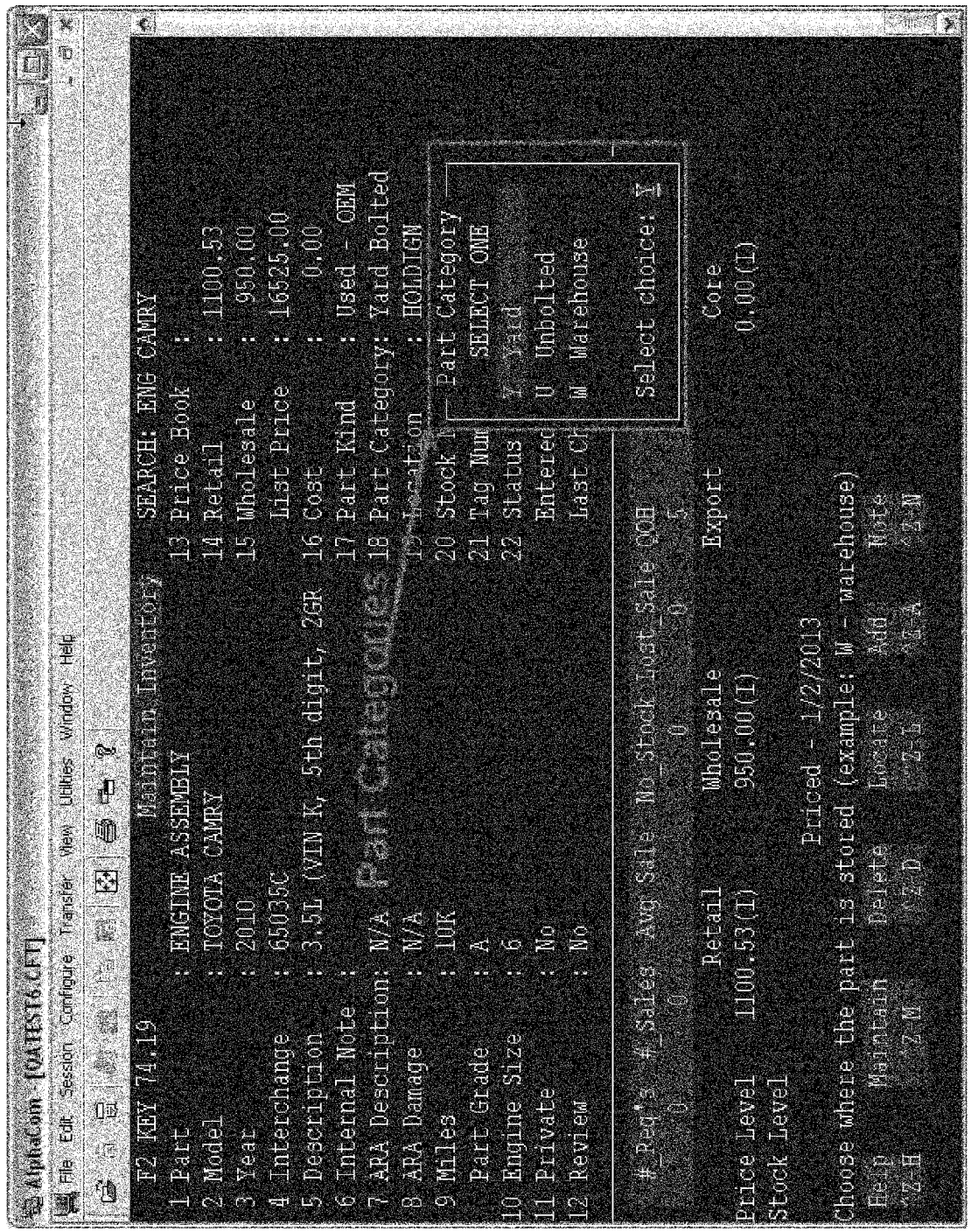
Figure 21:
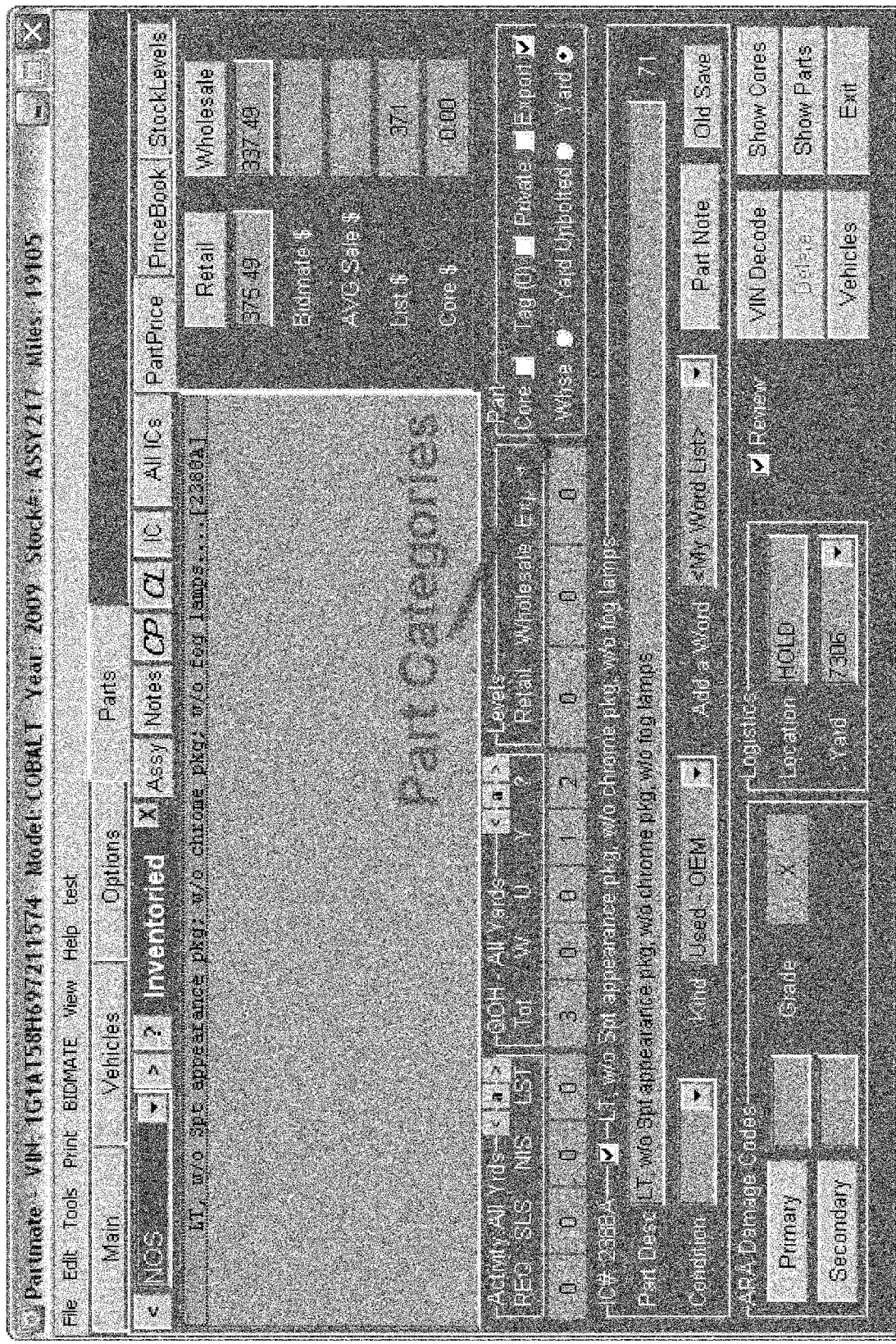
Figure 23:
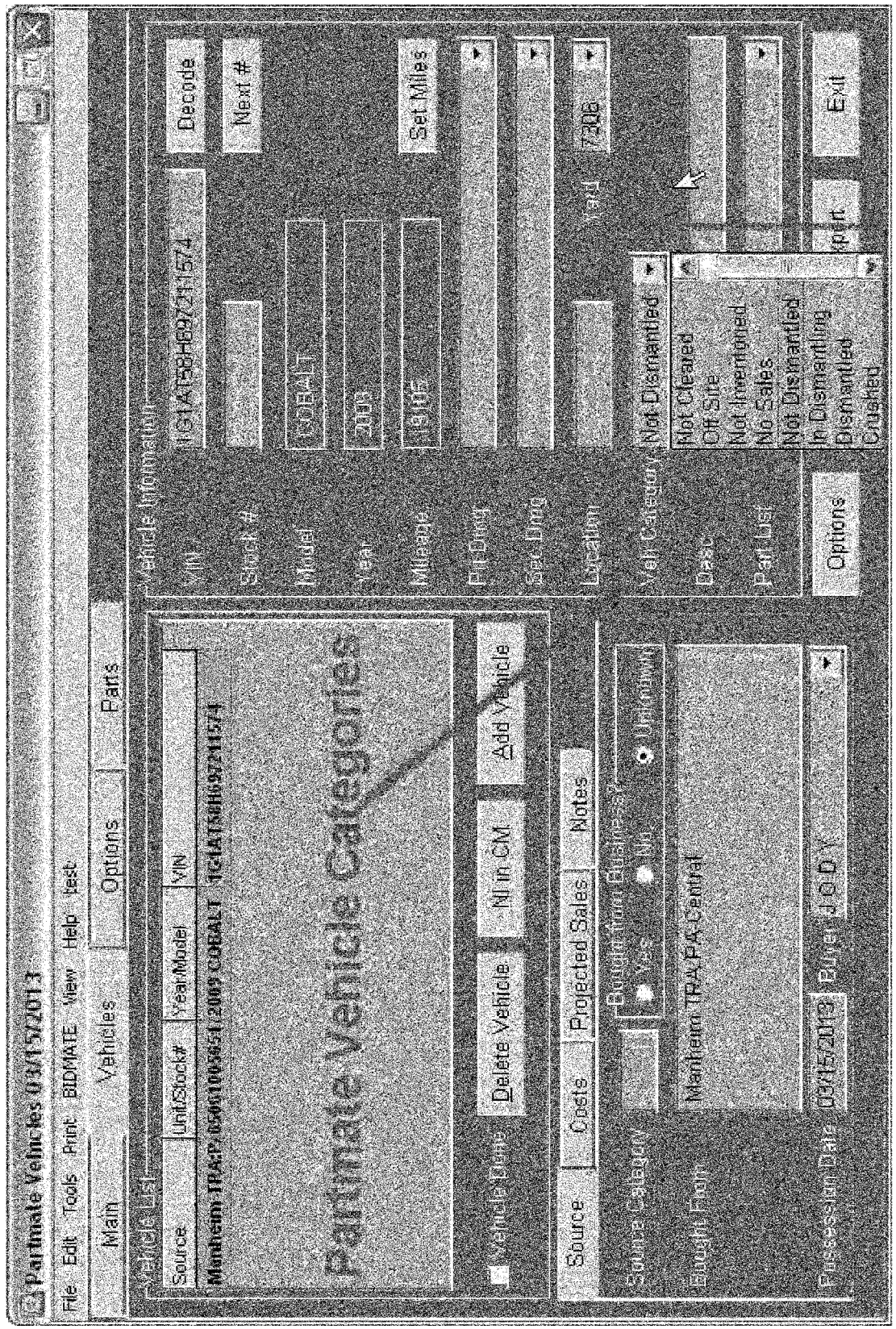
Figures 27, 28, 29, 30:
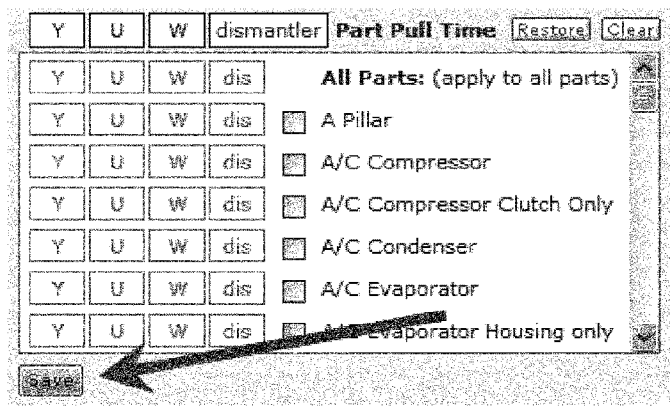
Figure 34:
Figure 35:
Figure 36:
Figure 43:
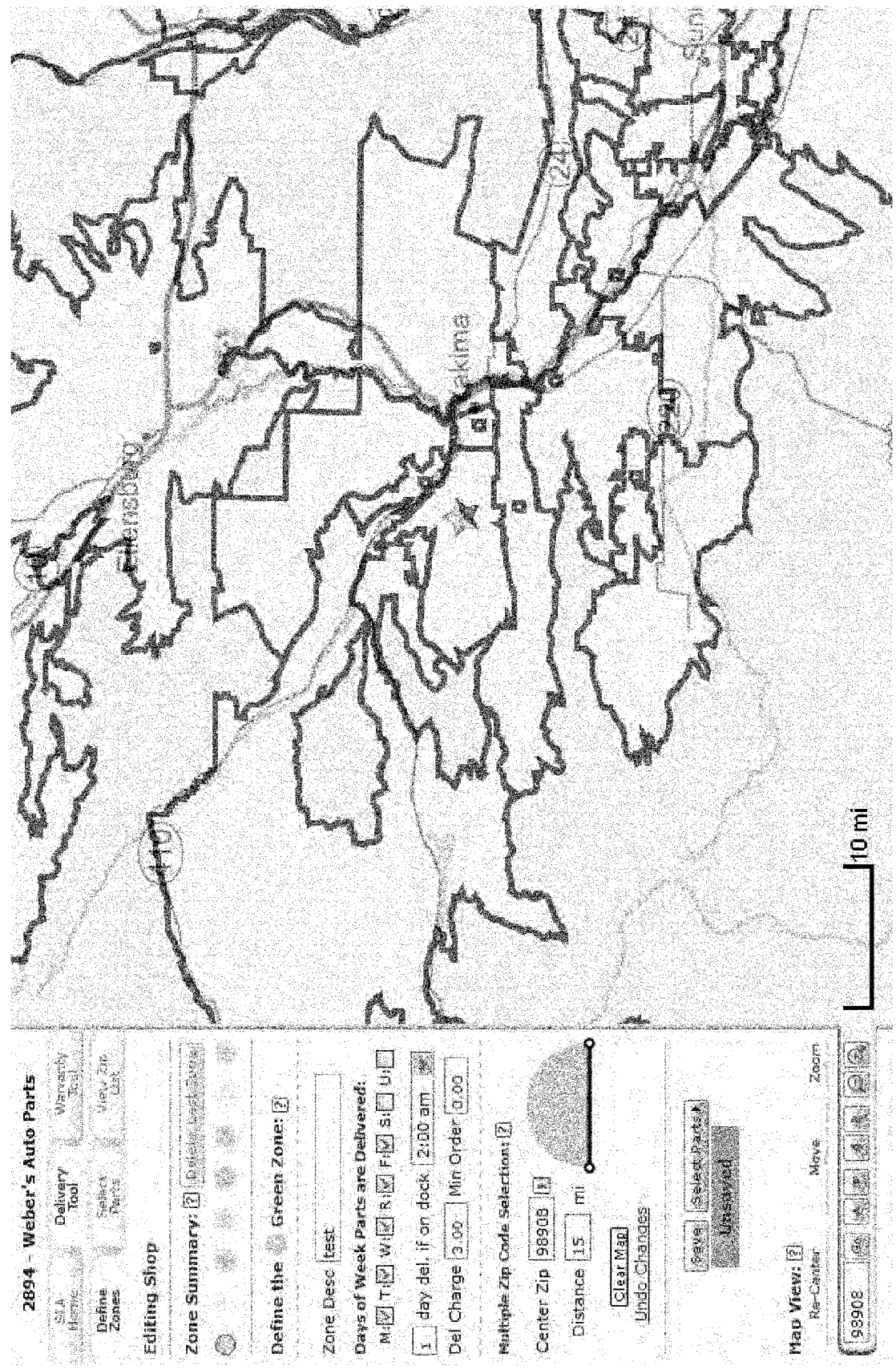
Figure 44:
Figure 45:
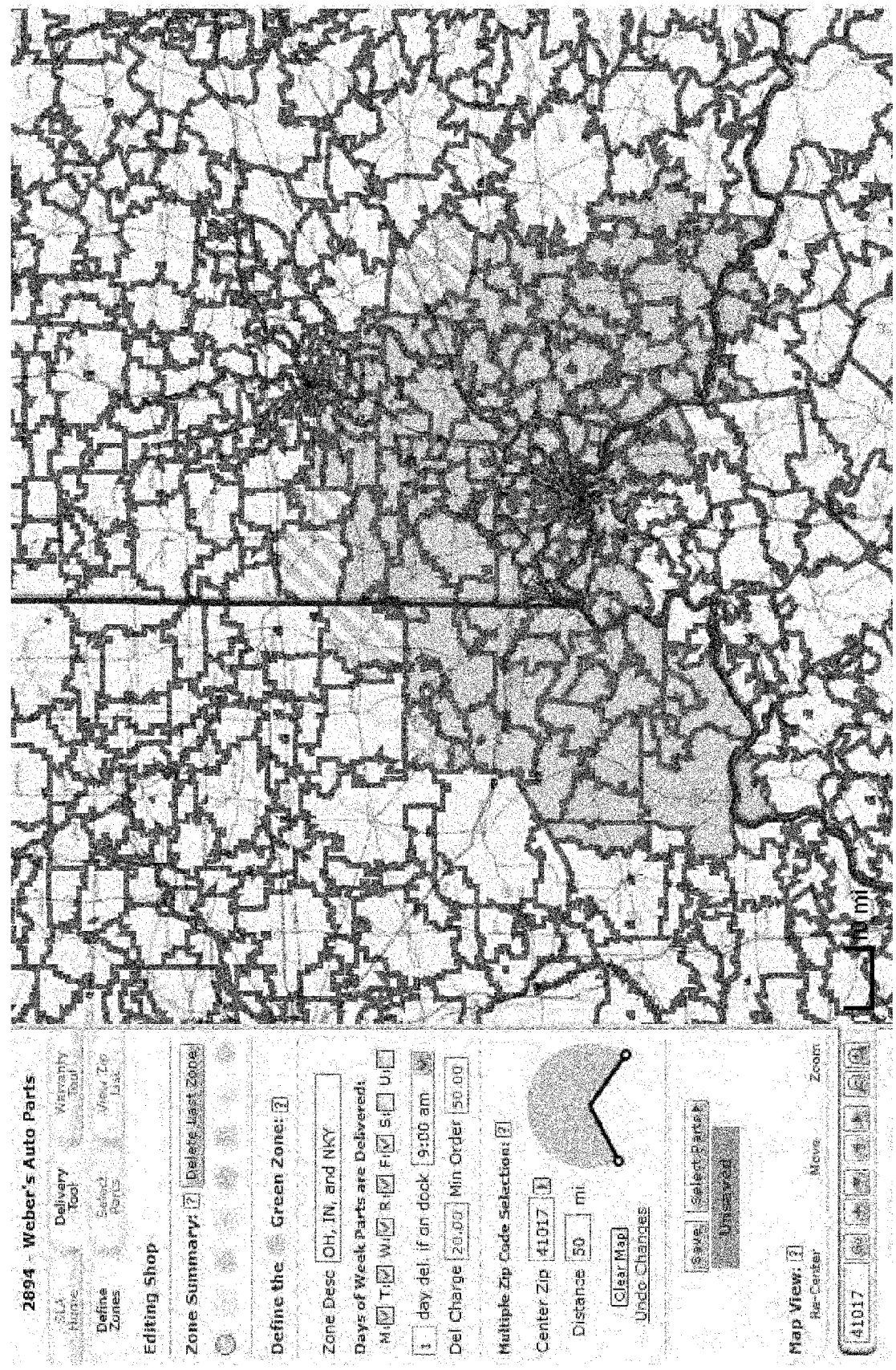
Figure 47:
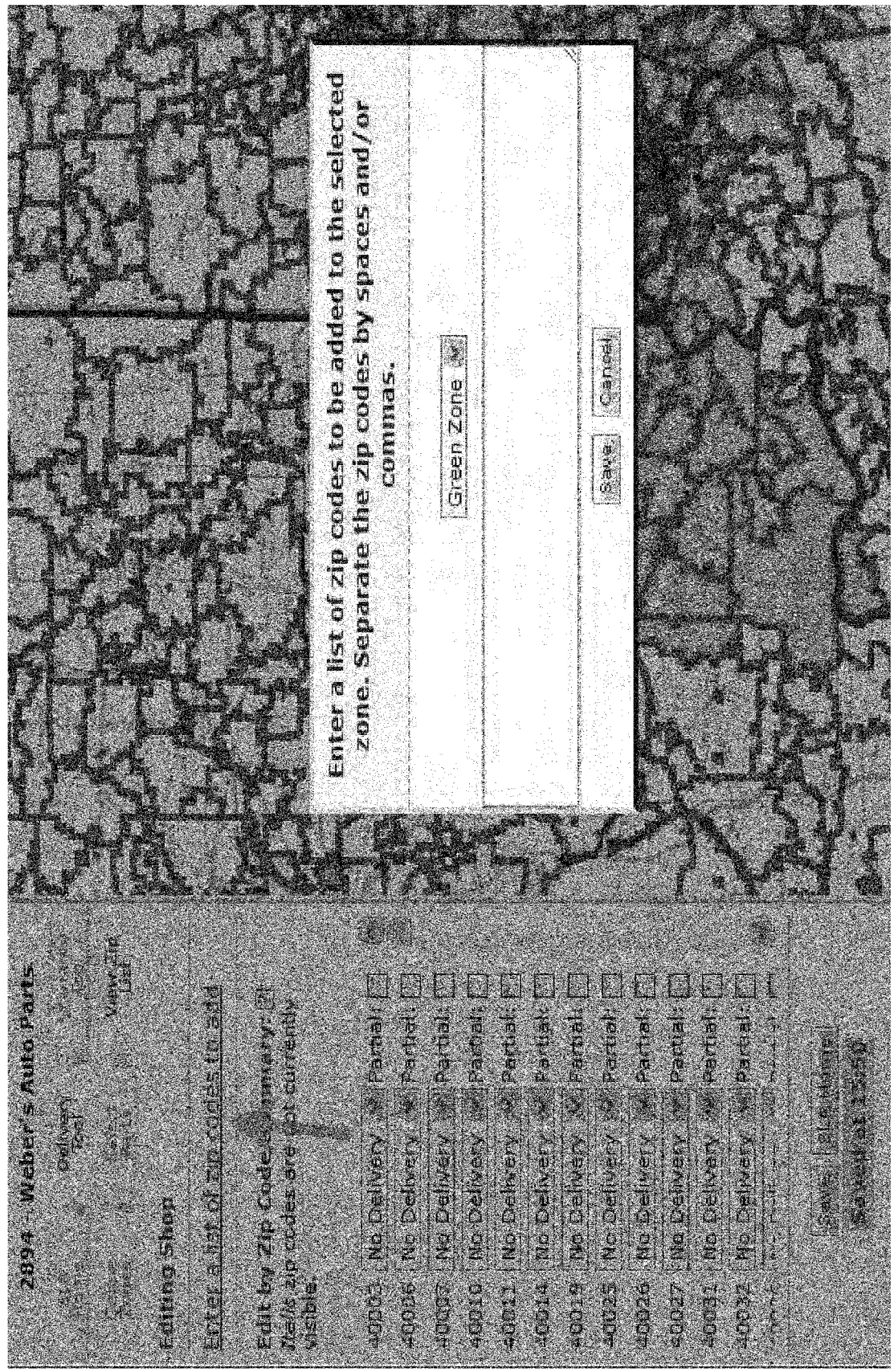
Figure 48:
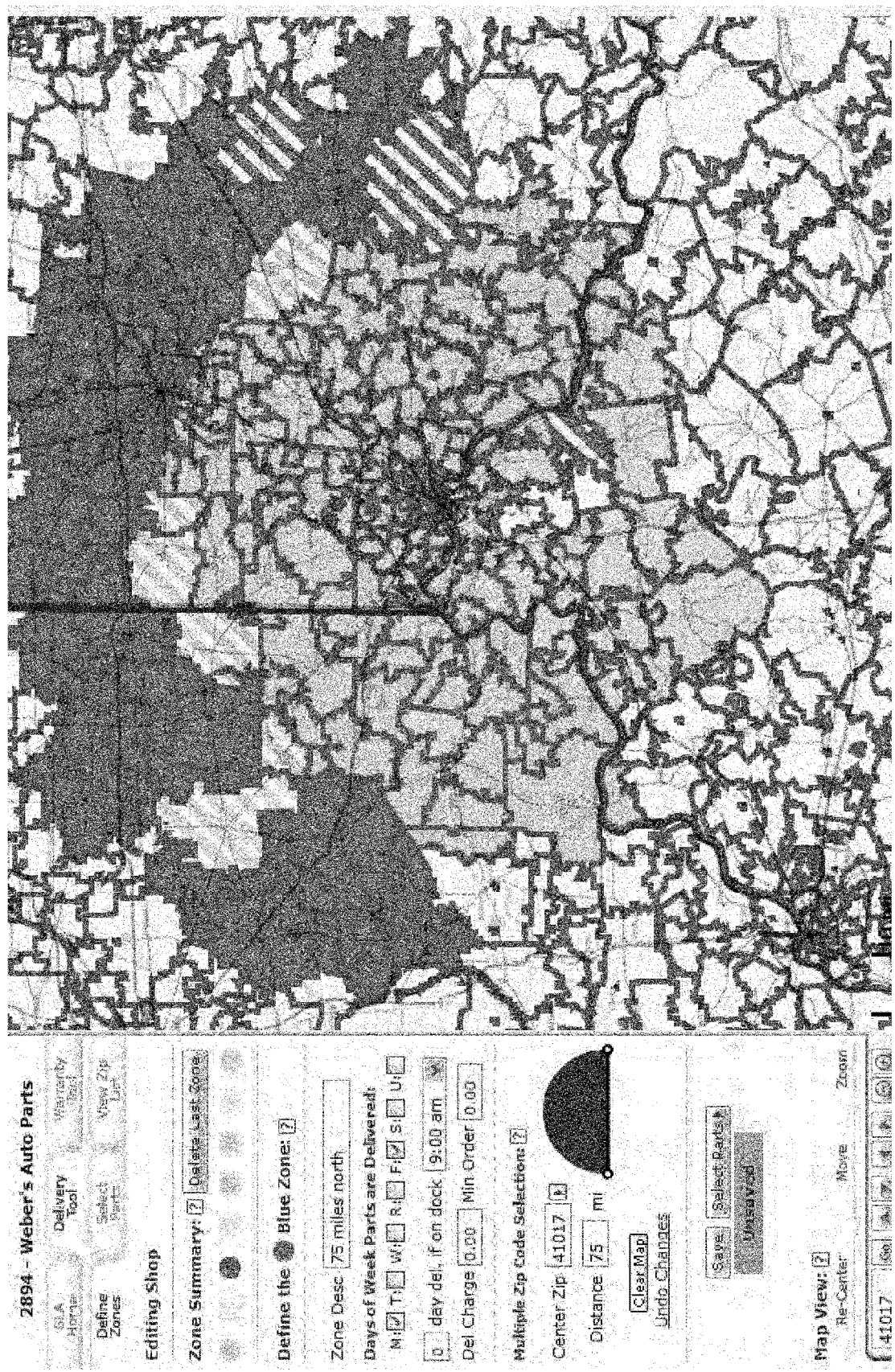
Figures 49, 50:
Figures 51, 52, 53:
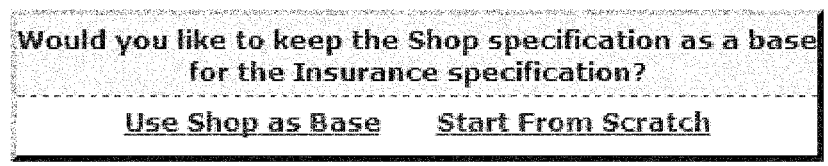
Figure 54:
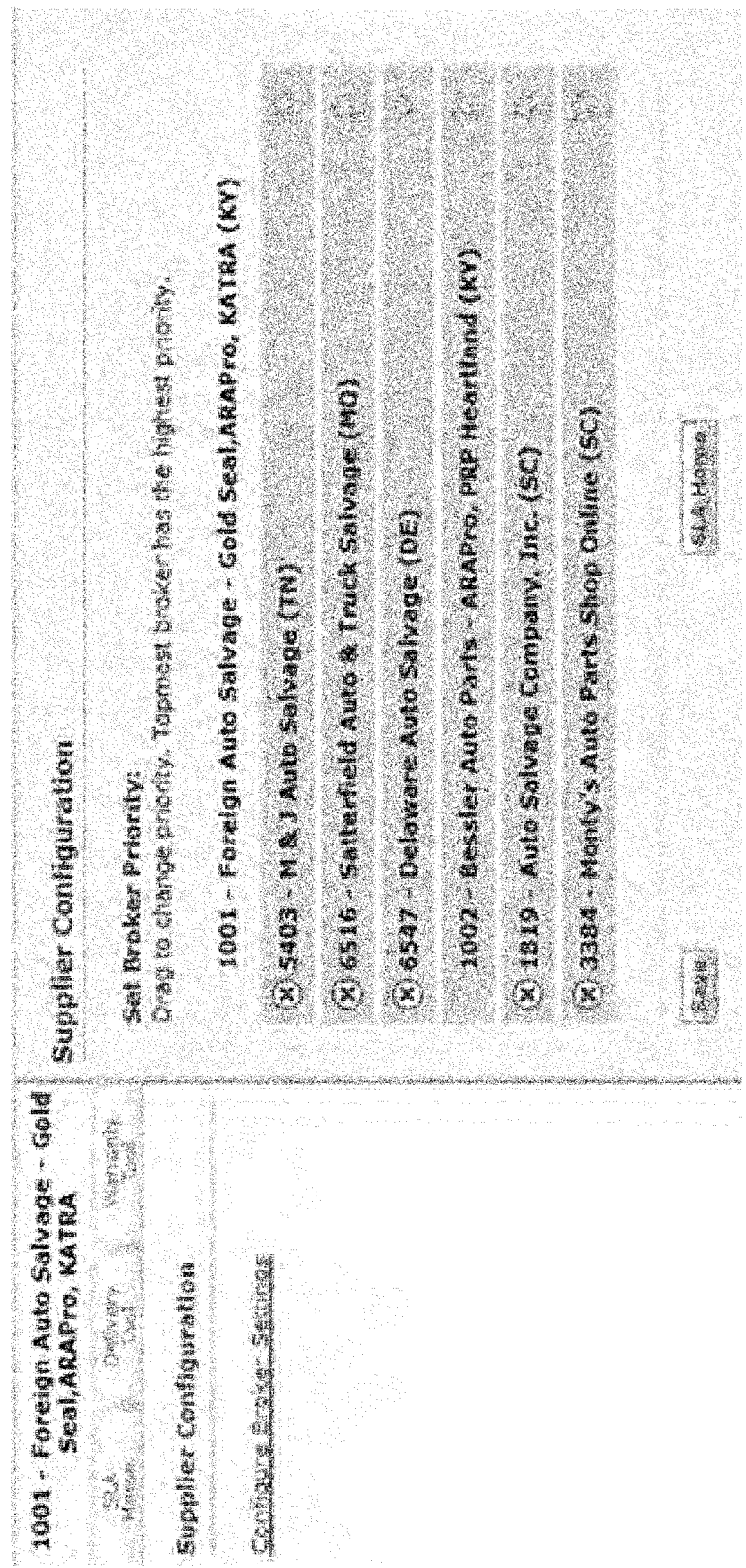
Figure 56:
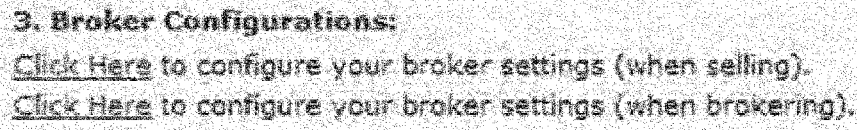
Figure 57:
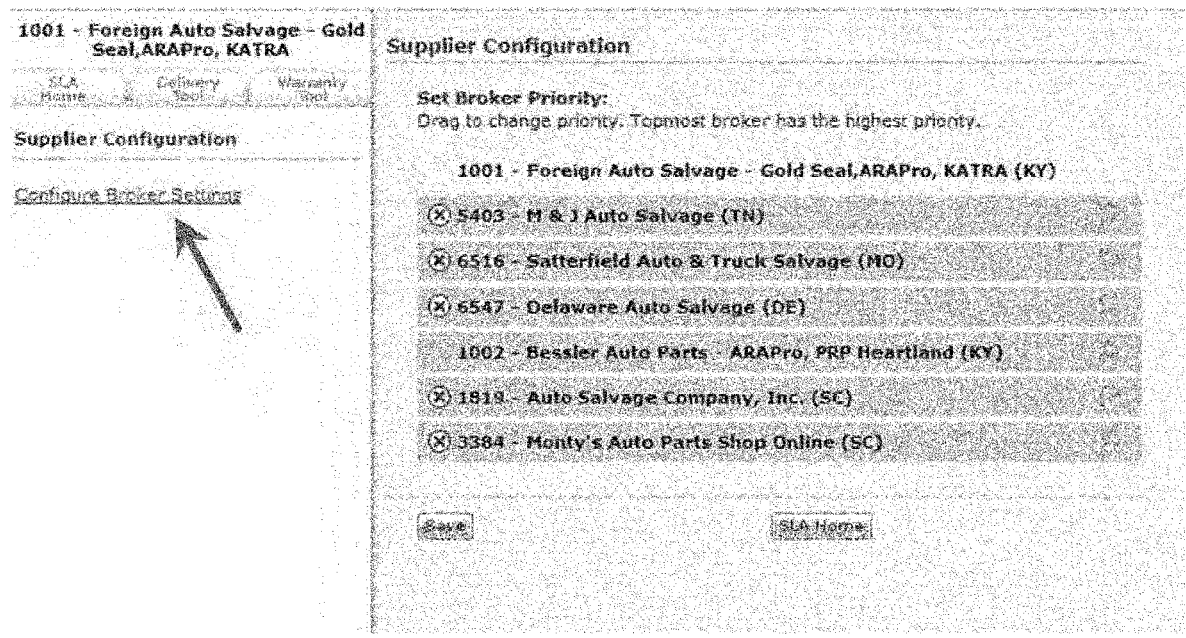
Figure 64:
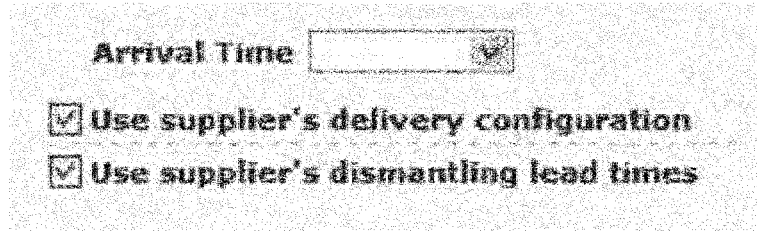
Figure 65:
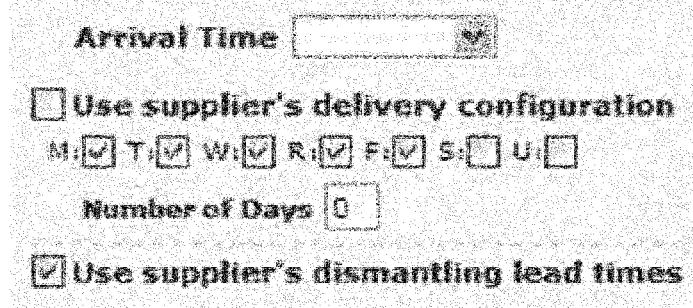
Figure 66:
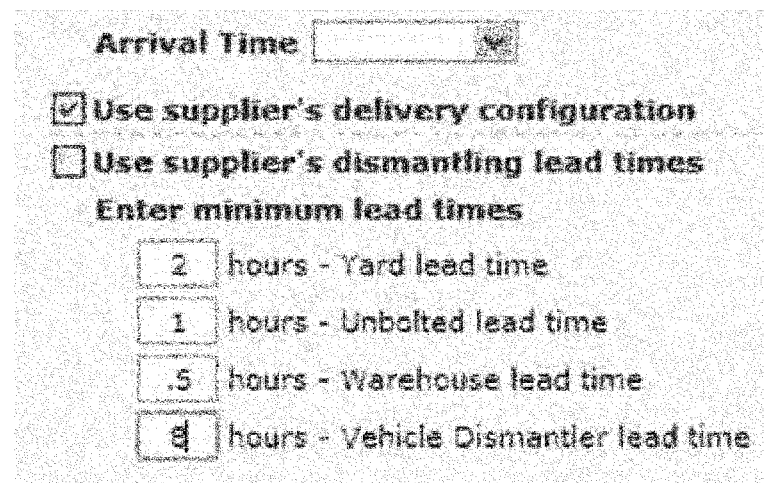

FIG. 3 illustrates the four tables which contain numerous entries for each recycler and part type to enable the identification of a delivery time for a particular part to a particular buyer given a particular search time. FIGS. 5-66 illustrate the process for gathering and storing data for these four tables. Regarding these four tables:

SLA_SEARCH_DELIVERY provides information on which particular buyer types are provided delivery of which part types, and under which conditions (e.g., minimum order requirement, delivery charges). This table includes multiple entries for each supplier or broker of parts, each entry stating, for one combination of buyer type, zip code, and delivery zone, whether the zone is fully or only partially eligible for delivery, whether there is a minimum order size, and whether there is a delivery charge.

SLA_SEARCH_DELIVERY_PARTS provides information on which types of parts a broker will deliver to each delivery zone. It includes multiple entries for each broker of parts, each entry stating, for one combination of buyer type, zone, and part code, whether there is conditional delivery of the item if sufficient other items are also being delivered.

SLA_SEARCH_PARTS provides information on the time it takes to get a part to a delivery truck from its location in the recycler yard, which may be, e.g., in the warehouse, unbolted but with the vehicle, or still on the vehicle. There is an entry for each combination of source, supplier and broker, part type, and location category (e.g., on vehicle, unbolted with vehicle, or warehouse), each entry identifying the total time for the part to be placed on the delivery truck departing the part source. Notably, the location categories supported include the three location codes that are standard in the industry ([Y] ard, [U] nbolted, and [W] arehouse), and also include a fourth category [dis] a.k.a. [V] which is supported by inventory systems provided by the assignee of this application. The [dis] or [V] code is used to designate parts (such as engine subassemblies) that are impractical to dismantle except in the context of dismantling the rest of the car or a large subassembly of the car. The distinction between [V] and [Y], where both are supported, is that [Y] parts do not implicate dismantling the entire vehicle or a larger portion of the vehicle, which is typically a much longer process than just disassembling a part off the vehicle.

SLA_SEARCH_TIME provides information on the total delivery days required to deliver a part given the search day and time and the time the part will take to get to the truck at the source's loading dock, accounting for travel distance, delivery days, location of delivery and the like. There is an entry for each combination of a part source, supplier and broker, buyer type and delivery zone, location category and time to truck, and search day and time; the entry identifies the number of days it takes to deliver the part given this combination of factors.

FIG. 3 illustrates that the process of computing Total Delivery Days for a part that is found in a part search, begins by the use of the SLA_SEARCH_DELIVERY table 1 to identify a delivery zone for the particular buyer, buyer zip code and seller. If there are conditions applicable to this Zone, such as delivery only to a part of the zone (partial delivery), a minimum order requirement, or a delivery charge, this is reported with the search result.

The seller's Zone for the delivery is fed to the SLA_SEARCH_DELIVERY_PARTS table 2 along with the part code, broker identifier, and buyer type, to determine if delivery is available or only conditionally available for that zone. Parts which do not have available delivery will not be displayed, and parts with conditional delivery may only be displayed if desired by the user.

The SLA_SEARCH_PARTS table 3 is used to determine the seller's time to place the part onto a delivery truck, based upon the location of the part, the part type, and based upon the seller's identity, and whether there are brokers or intermediaries involved in the transaction as identified by Part Source ID, Supplier ID and Broker ID. The output of this process is the total time to truck (TTT) for the part. TTT is computed on an hour and minute basis using the parameters of work days, times etc. provided by the part source. TTT is fed, along with the sellers Zone for the delivery, to the SLA_SEARCH_TIME table 4, along with the time of the search and part, seller and buyer information, to identify the total delivery days for the part, which is displayed to the buyer. The SLA_SEARCH_PARTS table answers the question whether, given the time to get the part to a truck, what day it will make it on the delivery truck, and thus what day it will come off that truck or a subsequent truck (after one or more transfers) when it arrives at the buyer's location. Normally, the buyer seeks only a commitment as the day of delivery and not time of day, however, in another and more detailed embodiment of the invention, the time of day of delivery could be identified by collecting details of the routing of delivery trucks.

One or more examples are provided below to illustrate the use(s) of the entries in these tables. For example, a shop may be looking for an engine from a recycler directly (no brokering). Assume the following broker/supplier/part source information:

1001 Foreign Auto Salvage is the Broker, Supplier, and Part Source

Business Hours: 9:00 a.m.-5:00 p.m.

Dismantle Days: Monday-Friday (for all categories)

Zip code: 41001 configured for delivery in Green zone for buyer types "Shop" and "Insurance"

Delivers to Green Zone same day if part is on loading dock by 12:30 p.m.
Delivery to Green Zone delivers Monday-Friday
Delivery charge to Green Zone is $0.00 delivery fee but had a minimum order of $75.00
Delivers Engines to Green Zone
Warehouse parts have a 1 hour lead time
Engines in the warehouse have a 1 hour pull time An engine in inventory is being searched by a buyer, has a price of $200.00, and is in the Warehouse. In this example, the following are the relevant table entries:

SLA_SEARCH_DELIVERY (there would be more entries for 1001, one for each buyer type, zip code, and zone they have configured):

| Broker ID | Buyer Type | Zip Code | Zone | Partial | Cost | Minimum Order |
|---|---|---|---|---|---|---|
| 1001 | Shop | 41001 | Green | No | $0.00 | $75.00 |

SLA_SEARCH_DELIVERY_PARTS (there would be more records for 1001, one for each buyer type, zone, part code they have configured.)

| Broker ID | Buyer Type | Zone | Part Code | Conditional |
|---|---|---|---|---|
| 1001 | Shop | Green | Engine | No |

SLA_SEARCH_PARTS (there would be more records for 1001, one for each part code and location category they have configured)

| Part Source ID | Supplier ID | Broker ID | Part Code | LOC_CAT | TTT |
|---|---|---|---|---|---|
| 1001 | 1001 | 1001 | Engine | Warehouse | 2 |

SLA_SEARCH_TIME (there would be more records for 1001, one for each buyer type, zone, location category, time to truck, search day of the week, and search time slot)

| ID | Buyer Type | Zone | LOC_CAT | TTT | Search Day | Search Time Start | Search Time End | Total |
|---|---|---|---|---|---|---|---|---|
| 1001 | Shop | Green | Warehouse | 2 | Sunday | 12:00 am | 11:59 pm | 1 |
| 1001 | Shop | Green | Warehouse | 2 | Monday | 12:00 am | 10:30 am | 0 |
| 1001 | Shop | Green | Warehouse | 2 | Monday | 10:31 am | 11:59 pm | 1 |
| 1001 | Shop | Green | Warehouse | 2 | Tuesday | 12:00 am | 10:30 am | 0 |
| 1001 | Shop | Green | Warehouse | 2 | Tuesday | 10:31 am | 11:59 pm | 1 |
| 1001 | Shop | Green | Warehouse | 2 | Wednesday | 12:00 am | 10:30 am | 0 |
| 1001 | Shop | Green | Warehouse | 2 | Wednesday | 10:31 am | 11:59 pm | 1 |
| 1001 | Shop | Green | Warehouse | 2 | Thursday | 12:00 am | 10:30 am | 0 |
| 1001 | Shop | Green | Warehouse | 2 | Thursday | 10:31 am | 11:59 pm | 1 |
| 1001 | Shop | Green | Warehouse | 2 | Friday | 12:00 am | 10:30 am | 0 |
| 1001 | Shop | Green | Warehouse | 2 | Friday | 10:31 am | 11:59 pm | 3 |
| 1001 | Shop | Green | Warehouse | 2 | Saturday | 12:00 am | 11:59 pm | 2 |

In a first example, the buyer type may be a shop and may have a zip code of 41001. System information may indicate a day of search of Tuesday and a time of search of 11:07 a.m. The buyer is a Shop searching for an engine to be delivered to zip code 41001 on Tuesday at 11:07 a.m. The seller has an engine in the Warehouse and delivers to zip code 41001 the same day (Green Zone with Shop buyer type). The seller has a 2-hour time to truck and can deliver parts the same day if they make it to the loading dock by 12:30 p.m. The part will take 2 hours to get to the loading dock from the point of search. Since the search happens at 11:07 a.m., the part will be on the loading dock at 1:07 p.m. This misses the 12:30 p.m. time needed to be at the loading dock to make the truck that day, so the part will be delivered the next delivery day, which is Wednesday, and the buyer will receive it Wednesday by end of day. This is 1 delivery day. The part costs $200.00, which exceeds the $75.00 minimum charge and qualifies for delivery.

In a second example, assume the same information for the buyer and seller as indicated above, but with different system information, resulting in a different delivery time. For example, the system information may indicate that the day of search is Saturday and the time of search is 3:30 p.m. This is the same search as Example 1, but on Saturday at 3:30 p.m. The recycler does not work on Saturday, so the part could be at the loading dock 2 hours after the start of business (Monday, 9:00 a.m.); therefore, the part could be ready by 11:00 a.m. Monday, which makes the 12:30 p.m. time needed to be at the loading dock in order to make the truck that day. With 0 delivery days configured (part arrives same day it is loaded on the truck), this search (or the same search any time on Saturday) will result delivery by the end of day Monday, which is 2 delivery days.

The tables shown in FIG. 3 are created by an initialization process, which includes:

Summarizing of general delivery preferences of a broker (collected by the process shown in FIGS. 5-66) to create SLA_SEARCH_DELIVERY table 1.

Summarizing part-specific preferences of a broker (collected by the process shown in FIGS. 5-66) to create SLA_SEARCH_DELIVERY_PARTS table 2.

Summarizing the part source's dismantling process, work hours and other internal timing (collected by the process shown in FIGS. 5-66) to create SLA_SEARCH_PARTS table 3.

Computing threshold times of arrival at the part source's truck or subsequent delivery trucks, at which a delivery day can be gained or lost, which is required for determining each entry of the SLA_SEARCH_TIME table 4. The process for this part of the initialization is set forth in pseudo code as shown below:

define function performDismantlingStep-performs the dismantling step of the delivery process inputs:
time ToTruck (time it takes, in hours of work required, to get a part on the truck—this is the sum of load/dismantle time and lead time)
searchDay (day the search was performed)
searchMinute (time of day the search was performed)
businessHours (contains values for each day-2 values, start of day, and end of day)
daysWorked (contains true/false values for each day, and for each category field, based on which days the recycler has a person available to dismantle/load parts for each category)
categoryField (the categoryField of the part being used)
outputs:
loadDay (day the part is loaded on the truck)
loadMinute (time of day that the part is loaded on the truck)
logic:
define CWM (day, category) (this is an intermediate result ("category work minutes") that contains the minutes that can be worked per day, by category)
for i in [0 to 3], for j in [0 to 6]
  if daysWorked (day=j, category=i) is true
    CWM (day=j, category=i)=businessHours (day=j, time=endOfDay)-businessHours (day=j, time=startOfDay)
  else
    CMW (day=j, category=i)=0
endfor
define tempJobTime=timeTo Truck (this is an intermediate result used to track the time left on the job)
//this is simply a normalization—so that in the main logic below, we can always assume we are starting at the beginning of the day
if (searchMinute>businessHours(day=searchDay % 7, time=startOfDay) && CWM (day=searchDay % 7, category=categoryField))
  if (searchMinute>businessHours (day=searchDay % 7, time=endOfDay))
    tempJobTime=tempJobTime+CWM (day=searchDay % 7, category=categoryField)
  else
    tempJobTime=tempJobTime+ (searchMinute-businessHours (day=searchDay % 7, time=startOfDay))
define loadDay, loadMinute
define tempCurDay=searchDay
//this is the core logic, it steps through day by day taking work hours off the total, until we have enough hours left to finish
while (tempJobTime>0)
  if (tempJobTime>CWM (day=tempCurDay % 7, category=categoryField))
    tempJob Time=tempJobTime-CWM (day=tempCurDay % 7, category=categoryField)
    tempCurDay++;
  else
    loadDay=tempCurDay;
    loadMinute=businessHours (day=tempCurDay % 7, time=startOfDay)+tempJobTime
    tempJobTime=0;
  endif
endwhile
return (loadDay, loadMinute)
//end of function performDismantlingStep define function performDeliveryStep-performs one delivery step of the delivery process inputs:
startDay (day the delivery step started, i.e. when the part was ready to load on a truck)
startMinute (time of day the delivery step started, i.e. when the part was ready to load on a truck)
deliveryZone, consisting of:
deliveryDays (the number of delivery days it takes to deliver to the zone)
deliverableDays (true/false values representing the days of the week the recycler is willing to deliver to this zone)
cutoffTime (the time in minutes at which point you must have a part ready to load, to get it on the truck that day)
arrivalTime (used for brokering only, this is the time in minutes that the truck is unloaded at the brokers location. arrivalTime will be null in a non broker zone)
outputs:
deliveryDay (day the part arrived at the location)
deliveryTime (time of day the part arrived at the location)
logic:
if (arrivalTime!=null && arrivalTime<cutoffTime && deliveryDays==0)
  deliveryDays=1
define totalDays=0
if (startMinute>cutoffTime && deliverableDays (day=startDay % 7)==true)
  totalDays=totalDays+1;
totalDays=totalDays+deliveryDays;
define currentDay=startDay
//step through day by day, counting each delivery day against the total number of delivery days until they match
while (totalDays!=0)
  if (deliverableDays(day=currentDay % 7)==true)
    totalDays=totalDays-1
  currentDay++
endwhile
if (arrivalTime=null)
  return (currentDay, 24*60-1)
else
  return (currentDay, arrivalTime)
//end of function performDeliveryStep
define function computeDeliveryTime (computes the total delivery time, in days, for a given case)
inputs:
businessHoursData (contains all the data on business hours for every recycler)
daysWorkedData (contains all the data on days worked for every recycler)
consumerZoneData (contains all the end user delivery zone data, has every zone for every buyer type defined by each recycler)
brokerZoneData (contains all the broker delivery zones, has delivery data for every supplier and broker combination)
seachDay (day of the search)
searchMinute (time of day of the search)
partSourceID (ID number of the entity who is the part source)
supplierID (ID number of the entity supplying the part)
brokerID (ID number of the entity who is serving the customer, i.e. the recycler whose name is on the part)
buyer Type (the type of the buyer, e.g. body shop)
deliveryZone (the end user delivery zone that contains the zip code of the buyer)

categoryField (the category field of the part)
timeToTruck (time it takes, in hours of work required, to get a part on the truck—this is the sum of load/dismantle time and lead time)
outputs:
businessDays (the number of business days that it will take for the part to be delivered) logic:
define loadDay, loadMinute
(loadDay, loadMinute)=perform DismantlingStep (timeToTruck, searchDay, searchMinute, businessHourData (recycler=partSourceID), daysWorkedData (reycler=partSourceID), categoryField)
//dismantling step is the same regardless of is this delivery includes a brokering relationship or not. however, if the part is being brokered, two delivery steps must be performed instead of one
define deliveryDay, deliveryMinute
if (partSourceID==supplierID==brokerID)
   (deliveryDay, deliveryMinute)=performDeliveryStep (loadDay, loadMinute, consumerZoneData (broker=brokerID, buyer=buyerType, zone=zone))
else if (partSourceID==supplierID && supplierID!=brokerID)
   (deliveryDay, deliveryMinute)=performDeliveryStep (loadDay, loadMinute, brokerZoneData (supplier=supplierID, broker=brokerID))
   (deliveryDay, deliveryMinute)=performDeliveryStep (loadDay, loadMinute, consumerZoneData (broker=brokerID, buyer=buyerType, zone=zone))
else if (partSourceID!=supplierID && supplierID==brokerID)
   (deliveryDay, deliveryMinute)=performDeliveryStep (loadDay, loadMinute, brokerZoneData (supplier=partSourceID, broker=brokerID))
   (deliveryDay, deliveryMinute)=performDeliveryStep (loadDay, loadMinute, consumerZoneData (broker=brokerID, buyer=buyerType, zone=zone))
else if (partSourceID!=supplierID && supplierID=brokerID)
   (deliveryDay, deliveryMinute)=performDeliveryStep (loadDay, loadMinute, brokerZoneData (supplier=partSourceID, broker=supplierID))
   (deliveryDay, deliveryMinute)=performDeliveryStep (loadDay, loadMinute, brokerZoneData (supplier=supplierID, broker=brokerID))
   (deliveryDay, deliveryMinute)=performDeliveryStep (loadDay, loadMinute, consumerZoneData (broker=brokerID, buyer=buyerType, zone=zone))
endif
//now, we need to get the number of business days it takes for delivery, which we display on the search results. current, we just know the start day and the delivery day
//here, we normalize for weekends
define businessDays=0
if (search Day is Saturday)
   businessDays=1
   search Day=searchDay+2
endif
if (searchDay is Sunday)
   businessDays=1
   search Day=searchDay+1
endif
//finally, we step through day by day, counting business days, until we get to the delivery day
while (searchDay<deliveryDay)
   if (search Day is Monday through Friday)
     businessDays=businessDays+1
   search Day=searchDay+1
endwhile
return businessDays
//end function computeDelivery Time
define function createOutputTable (creates the table output for a single case. to create the complete table used by the search script, this function must be called for every valid supplier, broker, buyerType, deliveryZone, categoryField, and timeToTruck combination) inputs:
partSourceID (ID number of the entity who is the part source)
supplierID (ID number of the entity supplying the part)
brokerID (ID number of the entity who is serving the customer, i.e. the recycler whose name is on the part)
buyer Type (the type of the buyer, e.g. body shop)
deliveryZone (the end user delivery zone that contains the zip code of the buyer)
categoryField (the category field of the part)
timeToTruck (time it takes, in hours of work required, to get a part on the truck—this is the sum of load/dismantle time and lead time)
table (the table to write result data to)
outputs: none (results are written to table)
data written to table consistent of the inputs, plus:
search Day (the day of the search that this record is applicable for)
rangeStart (the start of the time range on the day of the search, that this record is applicable for)
rangeEnd (the end of the time range on the day of the search, that this record is applicable for)
deliveryDays (the number of business days it will take to deliver the part)
logic:
//we essentially will try every minute of every day to find out the delivery days displayed for any search time, and collapse the same values into ranges, so the DB table is not too large to work with
//we also use a speedup to skip an hour ahead, to make this calculation faster. its true that at any point in the day, the number of delivery days it takes a minute later (until the end of the day), can only increase, or stay the same.
//therefore, we know that if at some point in time later in the day, there are still the same # of delivery days, then there are the same # of delivery days for all minutes in between
for (searchDay in [Sunday through Saturday])
   define rangeStart=0, rangeEnd=0, attemptedSpeedup=
   define deliveryDays=computeDeliveryTime (businessHoursData, daysWorkedData, consumerZoneData, brokerZoneData, searchDay, rangeStart, partSourceID, supplierID, brokerID, buyerType, deliveryZone, categoryField, timeToTruck)
   for (searchMinute in [0 to 24*60−1])
     define tempDays=computeDeliveryTime (businessHoursData, daysWorkedData, consumerZoneData, brokerZoneData, searchDay, searchMinute, partSourceID, supplierID, brokerID, buyerType, deliveryZone, categoryField, timeToTruck)
     if (tempDays!=deliveryDays)
       rangeEnd=searchMinute−1
       table.writeRow (partSourceID, supplierID, brokerID, buyerType, deliveryZone, categoryField, timeToTruck, searchDay, rangeStart, rangeEnd, deliveryDays)

```
            deliveryDays=tempDays
            rangeStart=searchMinute
         endif
      else if (attemptedSpeedup<=searchMinute)
         attemptedSpeedup=min     (searchMinute+60,
            24*60−1)
         tempDays=computeDelivery Time (business-
            HoursData, daysWorkedData, consumerZone-
            Data, brokerZoneData, searchDay, attempted-
            Speedup, partSourceID, supplierID, brokerID,
            buyerType, deliveryZone, categoryField, time-
            ToTruck)
         if (deliveryDays=tempDays)
            searchMinute=attemptedSpeedup
         endif
      endfor
      rangeEnd=24*60−1
      table.writeRow (partSourceID, supplierID, brokerID,
         buyerType, deliveryZone, categoryField, time-
         ToTruck, searchDay, rangeStart, rangeEnd, delivery-
         Days)
   endfor
//end function createOutputTable
```

Figure 4:
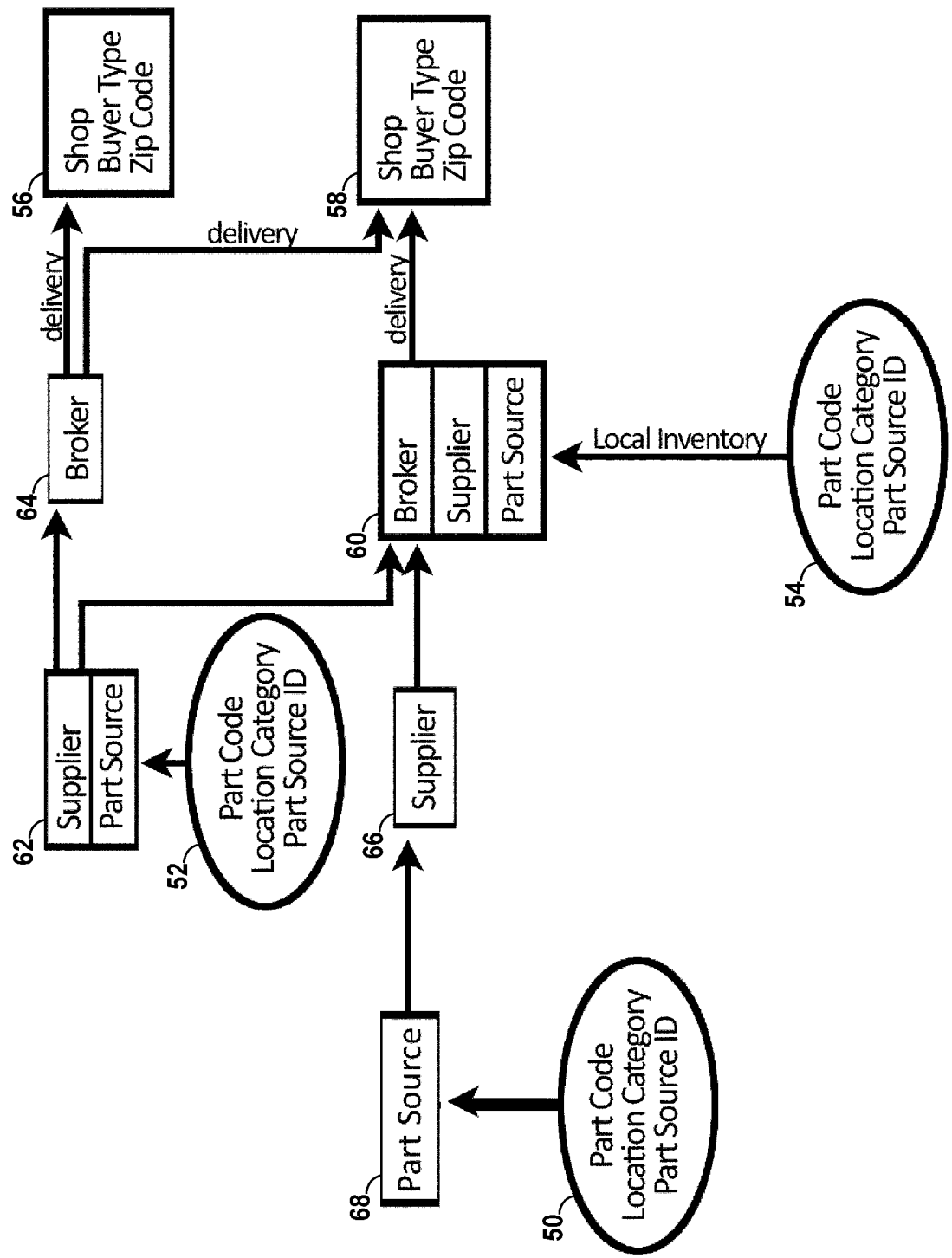
FIG. 4 is a part supply chain flow chart showing the manner in which parts can be sourced from various sources through direct or brokered relationships to two buyers.

FIG. 4 illustrates several sample scenarios of part supply to two repair shops (Shop 56 and Shop 58), each involving different criteria/filters to select parts.

The following definitions are helpful to understanding the diagram in FIG. 4:

A broker (60, 64) is an entity that actually sells a part to a buyer (Shop 56 and/or Shop 58);

A supplier (62, 66) provides a part to a broker (in circumstances where a broker sells a part out of its own physical inventory, a broker is also a supplier (See Broker 60)); and A part source supplies a part to a supplier (in circumstances where a broker sells a part out of its own physical inventory, a broker is also a part source (See Broker 60), and in circumstances where a supplier is providing a part out of its own physical inventory, a supplier is also a part source (See Supplier 62)).

SCENARIO 1: Parts Sold from a Broker's Own Physical Inventory.

When Broker 60 is selling parts to Shop 68 out of its own physical inventory, Broker 60 is filling the roles of broker, supplier, and part source in FIG. 4. Broker 60 has one or more parts such as 24 in its own physical inventory that meet the requirements of Shop 58. While these parts meet the requirements designated by Shop 58, they may have different delivery times because they are at different stages of Broker 60's dismantling and inventorying workflow. Also, because each part is unique and potentially has a different condition, each part that meets Buyer 58's criteria is displayed. At different time frames, some parts may be in Broker 60's warehouse, some parts may have already been unbolted from the vehicle but are stored in the vehicle, some parts may still be attached to the vehicle and require some unbolting work before they can be delivered to Shop 58, and other parts may still be on the vehicle but require extensive production work, e.g. the whole vehicle to be dismantled before that part is available to deliver to Shop 58. Accordingly, the stages that a part is at in Broker 60's dismantling and inventorying workflow, together with certain of Broker 60's business practices (e.g., the days and hours which Broker 60 performs dismantling activities, the days and hours which Broker 60 retrieves parts stored in vehicles, and Broker 60's lead times to retrieve and/or dismantle parts and vehicles, days and hours which Broker 60 delivers parts to various portions of its delivery area, and cut off times), all impact the delivery times for the part in Broker 60's physical inventory.

SCENARIO 2: Parts Brokered from a Supplier's Physical Inventory. Broker 60 has a brokering relationship with Supplier 66 so that Broker 60 can sell parts to Shop 58 that come from Supplier 62's physical inventory, such as part 52. As to that transaction, Broker 60 is filling the role of broker and Supplier 66 is filling the role of supplier and part source. Because of its brokering relationship with Supplier 66, Broker 60 may be able to sell to Shop 58 one or more parts from Supplier 66's physical inventory that meet the requirements of Shop 58. The amount of time that it will take Broker 60 to deliver a part obtained from Supplier 66's physical inventory to Shop 58 will be impacted by (1) the factors that affect Supplier 66's delivery time to Broker 60; (2) the factors that Broker 60 determines are different when Supplier 66 is delivering parts to Broker 60 instead of Supplier 66's own buyers, such as lead and priority times for dismantling parts and vehicles, and delivery days and arrival times (for example, Broker 60 may not be open to accept deliveries on Saturday even though Supplier 66 delivers to brokers on Saturday); and (3) the factors that affect Broker 60's delivery time to Shop 58 after it receives the part from Supplier 66. The factors that affect Supplier 66's delivery time to Broker 60 include those discussed in Scenario 1 above (e.g., the stage of the part in Supplier 66's dismantling and inventory workflow, days and hours which Supplier 66 performs dismantling activities, days and hours which Supplier 66 retrieves parts stored in vehicles, Supplier 66's lead times, days and hours which Supplier 66 delivers parts to various portions of its broker delivery area, and cut-off times). The factors that affect Broker 60's delivery time to Shop 58 after it receives the part from Supplier 66 include the day and hour of the arrival time of a part from Supplier 66, Broker 60's handling times, days and hours which Broker 60 delivers parts to various portions of its delivery area, cut-off times, and whether Broker 60 is delivering other parts to Shop 60 along with a part that it obtained from Supplier 66.

SCENARIO 3: Parts Brokered from Multi-Tier Supply Chain. When Broker 60 has a brokering relationship with Supplier 66 and Broker 60 is selling parts to Shop 58 that Supplier 66 obtains from Part Source 68's physical inventory (Inventory 50), Broker 60 is filling the role of broker, Supplier 66 is filling the role of supplier, and Part Source 68 is filling the role of part source. Because of its brokering relationship with Supplier 66, Broker 60 may be able to sell to Shop 58 one or more parts from Supplier 66's "inventory" that meet the requirements of Shop 58; however, Supplier 66 will need to obtain the part(s) from Part Source 68 before it can deliver the part(s) to Broker 60 (because the part(s) is/are not in Supplier 66's physical inventory). The amount of time that it will take Broker 60 to deliver a part obtained from Supplier 66 to Shop 58 will be impacted by (1) the factors that affect Part Source 68's delivery time to Supplier 66, (2) the factors that affect Supplier 66's delivery time to Broker 60 after it receives the part from Part Source 68; (3) the factors that Broker 60 determines are different when Supplier 66 is delivering parts to Broker 60 instead of Supplier 66's own buyers such as lead and priority times for dismantling parts and vehicles, and delivery days and arrival times; and (4) the factors that affect Broker 60's delivery time to Shop 58 after it receives the part from Supplier 66. The factors that affect Part Source 68's delivery time to Supplier 66 include those discussed in Scenario 1 above (e.g., the stage of the part in Part Source 68's dismantling and/or inventory workflow, days and hours which Part Source 68 performs dismantling activities, days and hours which Part Source 68 retrieves parts stored in vehicles, Part Source 68's lead times, days and hours which Part Source 68 delivers parts to various portions of its delivery area, and cut off times). The factors that affect Supplier 66's delivery time to Broker 60 after it receives the part from Part Source 68 include the day and hour of the arrival time of a part from Part Source 68, Supplier 66's handling times, days and hours which Supplier 66 delivers parts to various portions of its delivery area, delivery cut-off times, and whether Supplier 66 is delivering other parts to Broker 60 along with a part that it obtained from Part Source 68. The factors that affect Broker 60's delivery time to Shop 58 after it receives the part from Supplier 66 include the day and hour of the arrival time of a part from Supplier 66, Broker 60's handling times, days and hours which Broker 60 delivers parts to various portions of its delivery area, delivery cut-off times, and whether Broker 60 is delivering other parts to Shop 58 along with a part that it obtained from Supplier 66. Many calculations regarding delivery times are made in real time because they change based on the time of day that the buyer (Shop 58) performs the search and/or purchases a part.

NOTE REGARDING SCENARIOS 1, 2, AND 3: When Shop 58 conducts a search for parts, Broker 60 may have part search results that come through one or more of the supply channels described in Scenarios 1, 2, and 3 above (some of the parts may come from Broker 60's own physical inventory (SCENARIO 1), some of the parts may come from the physical inventory of a supplier with which Broker 60 maintains a brokering relationship (SCENARIO 2), and some of the parts may come through a multi-tier supplier chain (SCENARIO 3)). Each of such parts may reflect different delivery times from Broker 60 to Shop 58 based on the factors discussed in Scenarios 1, 2, and 3 above.

SCENARIO 4: Brokered Parts Available through Multiple Brokers. Often, suppliers will maintain brokering relationships with several brokers. In the diagram above, both Broker 60 and Broker 64 broker Supplier 66's parts. Depending on the requirements that Shop 58 designates, it may see:

(1) part search results from only one of the brokers which broker parts from Supplier 66; e.g., Shop 58 only sees Supplier 62's parts as brokered through Broker 60 because Shop 58's designated requirements caused Broker 64's parts to be excluded from the search results;

(2) part search results from more than one broker which broker parts from Supplier 66; e.g., because both brokers met the requirements designated by Shop 58, Shop 58 would see Supplier 66's parts as brokered through Broker 60 and Broker 64—the same part may show up multiple times in the part search results (potentially with different delivery times and/or differences in other services such as warranties)—once displayed under Broker 60's name and once displayed under Broker 64's name; or (3) only see the best brokered part designated as a search requirements, in which case it will only see parts of a supplier as brokered by one broker determined based on priorities established by the part source of the subject part; e.g., even though Supplier 66's part as brokered through either Broker 60 or Broker 64 would meet the requirements designated by Shop 58, Shop 58 only sees the part as brokered by Broker 64 in the part search results because Supplier 66 has Broker 64 listed higher in its priority list of brokering partners. Broker priority lets Supplier 66 to designate the order of priority of its broker partners that will show its brokered parts after the brokers have met all other buyer requirements (such as warranty levels, delivery times, etc.). Supplier-based priorities are applied as a way to reduce multiple entries for the same unique part to one entry after all other buyer designated requirements are applied and met. Note, however, that Buyer criteria could result in one of the presentations of the part being filtered from the results, in which case, the buyer would see (1) above, i.e. results from only one of the brokers.

The present invention encompasses broad aspects which are capable of implementation in a number of forms and embodiments. All embodiments contemplated hereunder that achieve the benefits of the invention therefore have not been shown in complete detail. For example, principles of the present invention may be applied to supply chain management outside of the context of vehicle parts, salvage yards, part warehouses, and the like. Other supply chains facing similar challenges can also take advantage of the inventive concepts. Examples may include collectible items, artwork, and components used for custom manufacturing, among others. Other embodiments may therefore be developed without departing from the spirit of the invention.

The invention claimed is:

1. A method for selecting vehicle parts for sale, comprising the following processor-implemented steps:
   - in a central processor, assembling information on the vehicle parts by communicating with a plurality of processors of respective remote computer systems respectively hosting independent inventory systems into a centralized database in a centralized computer system,
   - in a central processor, augmenting the information on the vehicle parts with additional information which does not exist in the independent inventory systems by evaluating tabulated information describing delivery and dismantling processes of a plurality of businesses which are using the independent inventory systems, the augmenting step including computing for each of the vehicle parts, a delivery time for the vehicle part based upon the tabulated information for a business involved in delivery of the part, wherein the vehicle parts include vehicle parts requiring dismantling from a source vehicle in a vehicle salvage yard, wherein the delivery time for a vehicle part requiring dismantling from a source vehicle includes a computed time for dismantling from a source vehicle,
   - in a central processor, retrieving vehicle parts from the centralized database system which match a criterion applied to the centralized database, and
   - in a central processor, collecting the vehicle parts in a format or organization responsive to the results of the retrieving step.

2. The method of claim 1 further comprising in a central processor verifying availability of at least one vehicle part, and displaying only those vehicle parts which are verified as available in the verifying step.

3. The method of claim 1 further comprising in a central processor verifying availability of at least one vehicle part, and displaying vehicle parts which are verified as available with a higher priority than vehicle parts which are not verified as available in the verifying step.

4. The method of claim 1 further comprising in a central processor verifying availability of at least one vehicle part, and displaying vehicle parts which have been verified as available in the verifying step, prioritized based upon search criteria other than availability.

5. The method of claim 1 further comprising in a central processor verifying availability of at least one vehicle part, and transmitting records of vehicle parts which have been verified as available in the verifying step to a third-party application for use in one or more of repair estimating, shop management, claims management or claim auditing.

6. The method of claim 1 further comprising in a central processor verifying availability of at least one vehicle part, and displaying an automatic recommendation of a vehicle part that best matches a search criterion and has also been verified as available in the verifying step.

7. The method of claim 1 wherein the step of augmenting the information on the vehicle parts comprises augmenting the information on the vehicle parts with information describing the manner in which a business utilizing a respective independent inventory system performs steps of locating, verification, or procurement of parts.

8. The method of claim 1 wherein the information on the vehicle parts comprises an inventory coding for one or more of a storage location and dismantling status of a vehicle established by a business utilizing a respective independent inventory system.

* * * * *